United States Patent [19]

Hague et al.

[11] 4,335,498
[45] Jun. 22, 1982

[54] MACHINE TOOL

[75] Inventors: Robert Z. Hague, Oradell, N.J.;
Matthew F. Marsicano, Forest Hills;
Edwin F. Hantman, New York, both
of N.Y.

[73] Assignee: Textron, Inc., Providence, R.I.

[21] Appl. No.: 18,628

[22] Filed: Mar. 8, 1979

[51] Int. Cl.³ .......................................... B23Q 3/157
[52] U.S. Cl. ...................... 29/568; 74/820;
92/9; 188/311; 188/314
[58] Field of Search ............... 29/568, 26 A; 408/10,
408/135; 74/817, 820; 92/9; 188/297, 311, 314,
318

[56] References Cited

U.S. PATENT DOCUMENTS 3,463,036 8/1969 O'Connor .......................... 408/10
4,008,518 2/1977 Hague et al. ....................... 29/568

FOREIGN PATENT DOCUMENTS 1084904 1/1955 France ................................. 74/817

Primary Examiner—Z. R. Bilinsky
Attorney, Agent, or Firm—Arthur T. Fattibene

[57] ABSTRACT

A machine tool having a spindle assembly associated with an indexing tool storage rack on which a number of distinct tools are stored, and a transport or tool carriage for conveying a selected tool between the storage rack and the spindle assembly; and including a control circuit for sequencing the operation of the various component parts of the machine tool for either manual or automatic operation. The spindle assembly includes a variable speed motor drive for rotating a spindle having a drawbar for releasably securing a tool adaptor with the tool to the end of the spindle and which is associated with a push rod operable to control the release of the tool adaptor during a tool changing operation. A spindle gear shifting assembly is operatively connected to the spindle for shifting of the spindle between direct high speed drive and back gear low speed drive or to a neutral position in which the spindle is disengaged from the variable speed motor drive. The arrangement is such that the machine tool is driven by a single AC motor and the various other component parts sequenced by fluid actuators. The invention further contemplates the utilization of a fluid actuated motor drive having a closed looped hydraulic circuit for controlling the operation of the tool carriage, including a vena contracta with means for expelling entrained air to prevent the system from being spongy.

9 Claims, 29 Drawing Figures

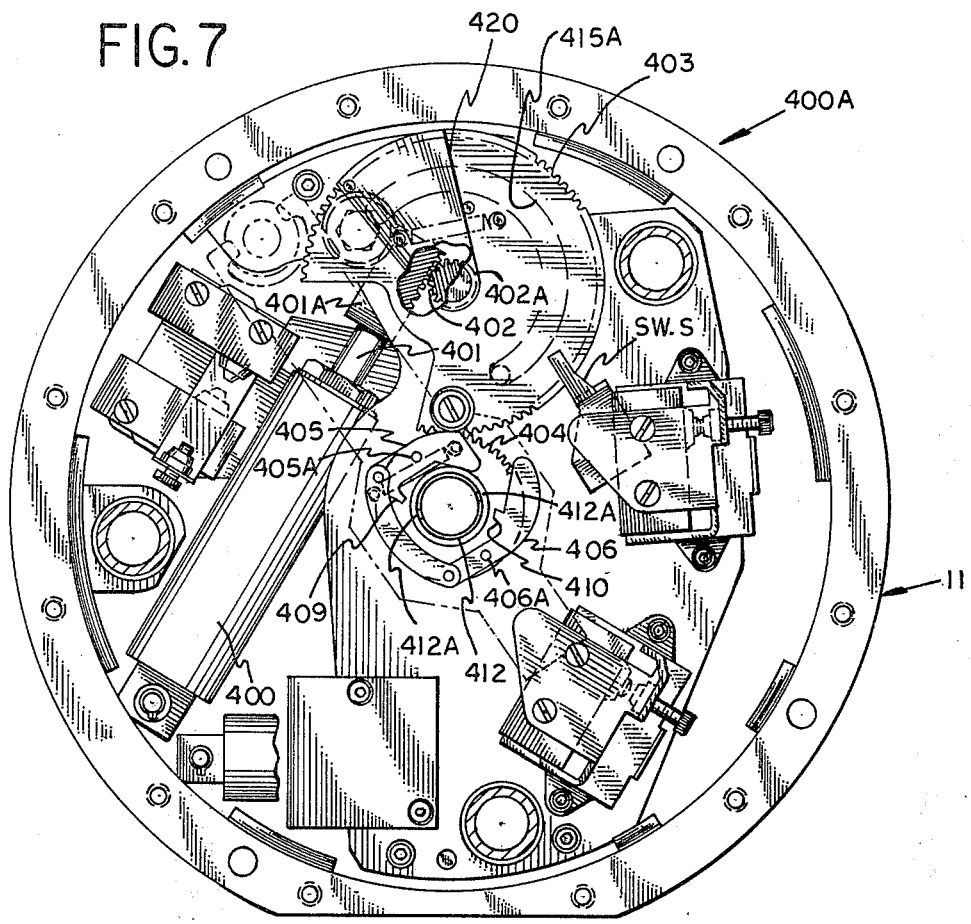
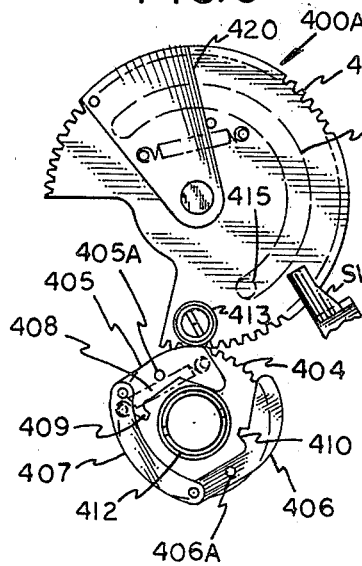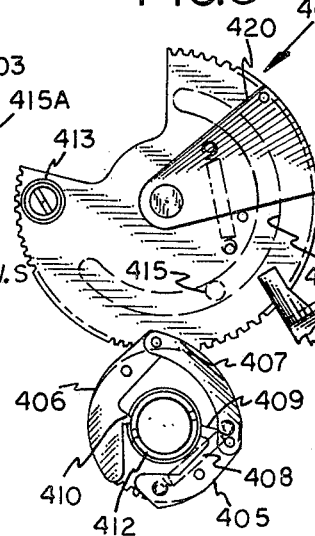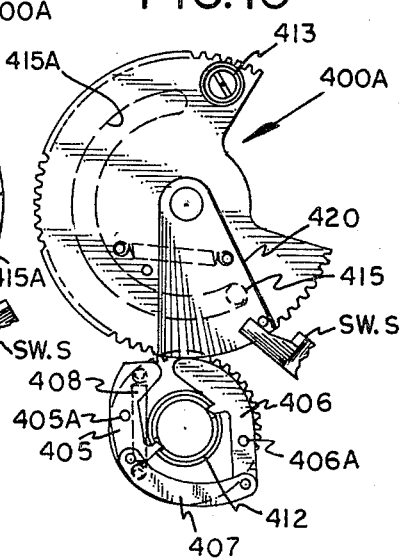

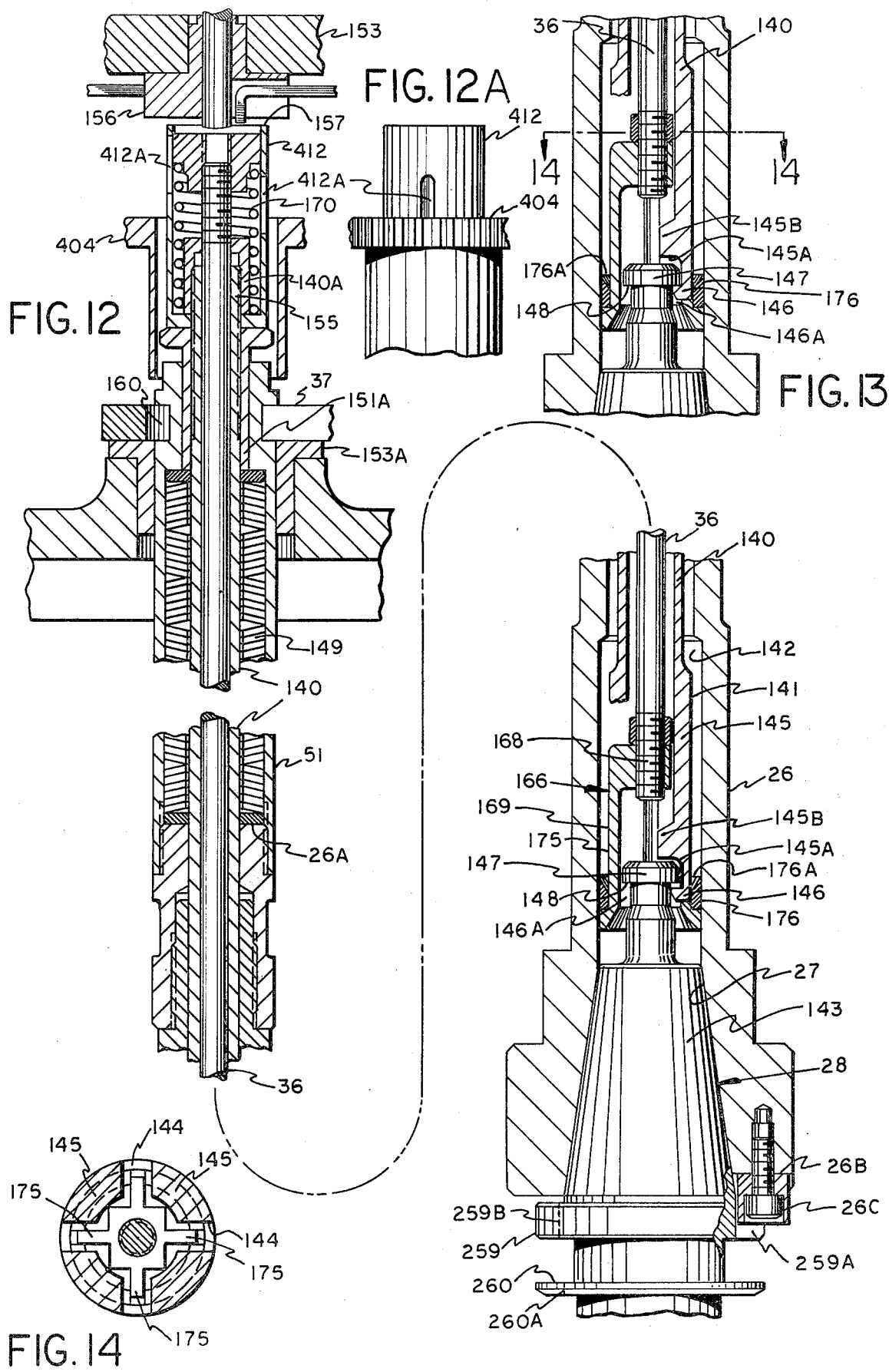

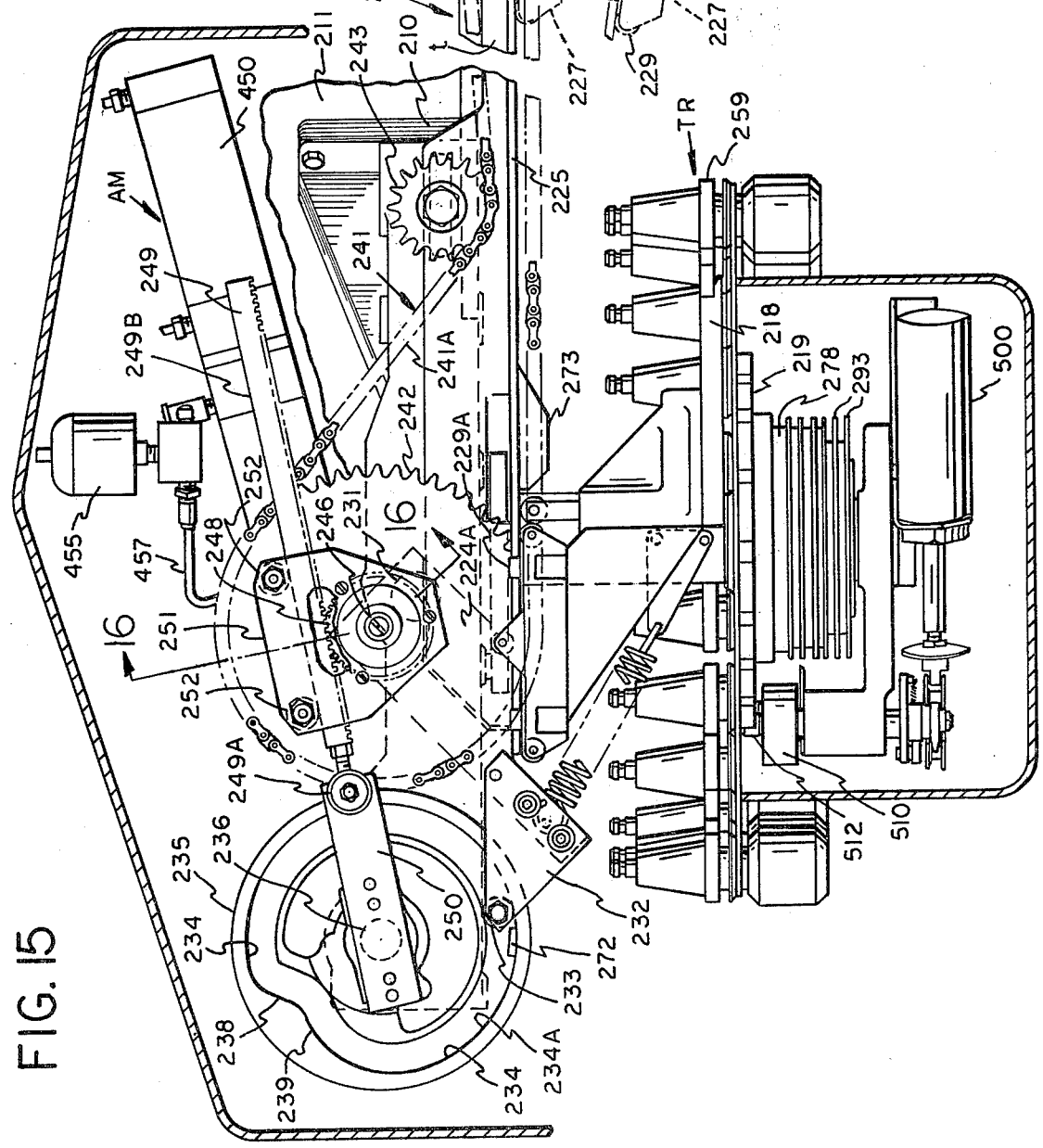

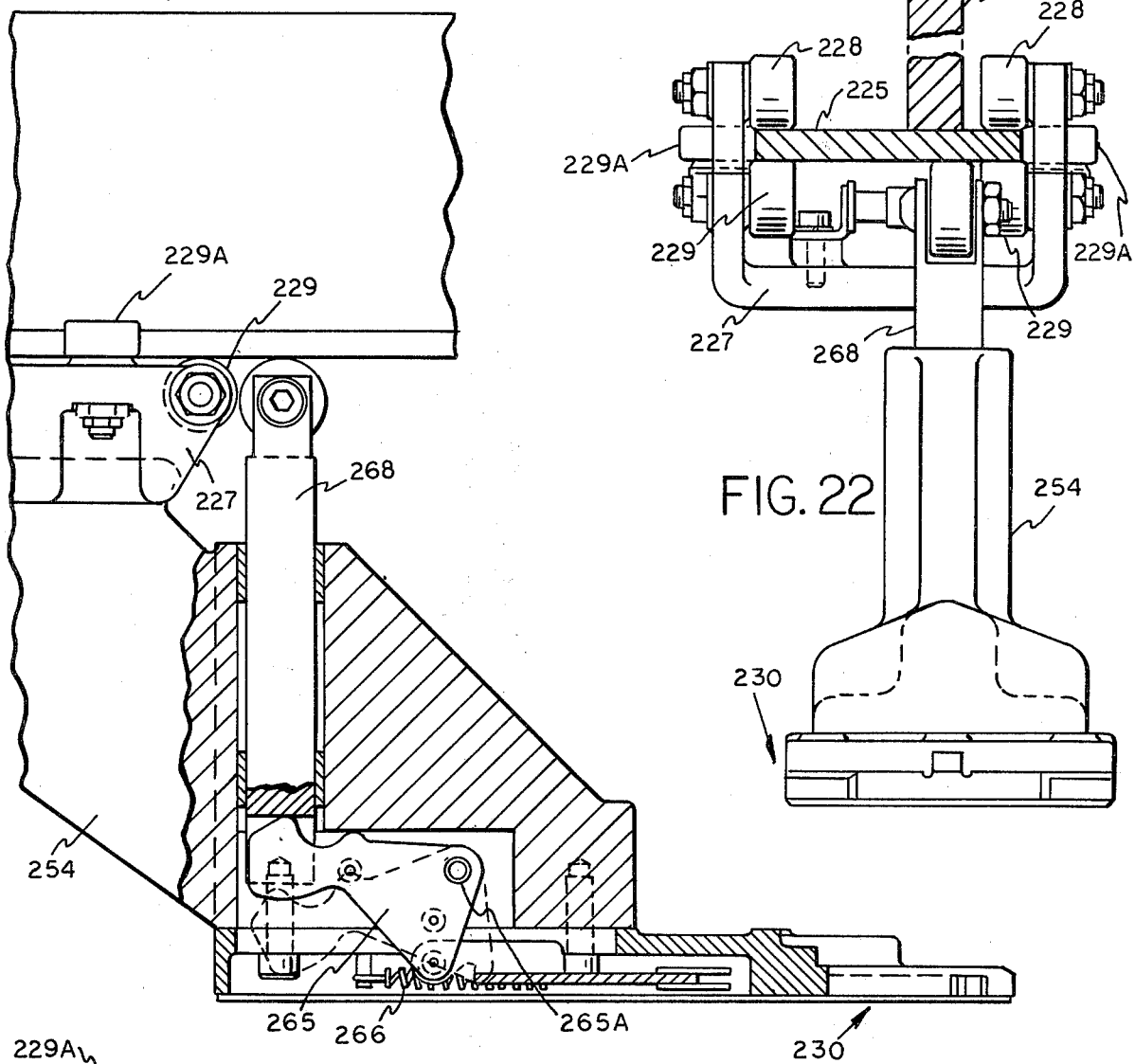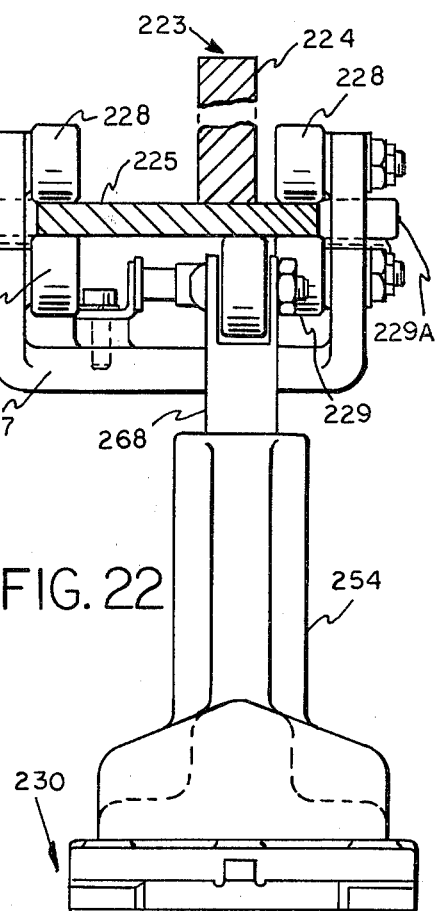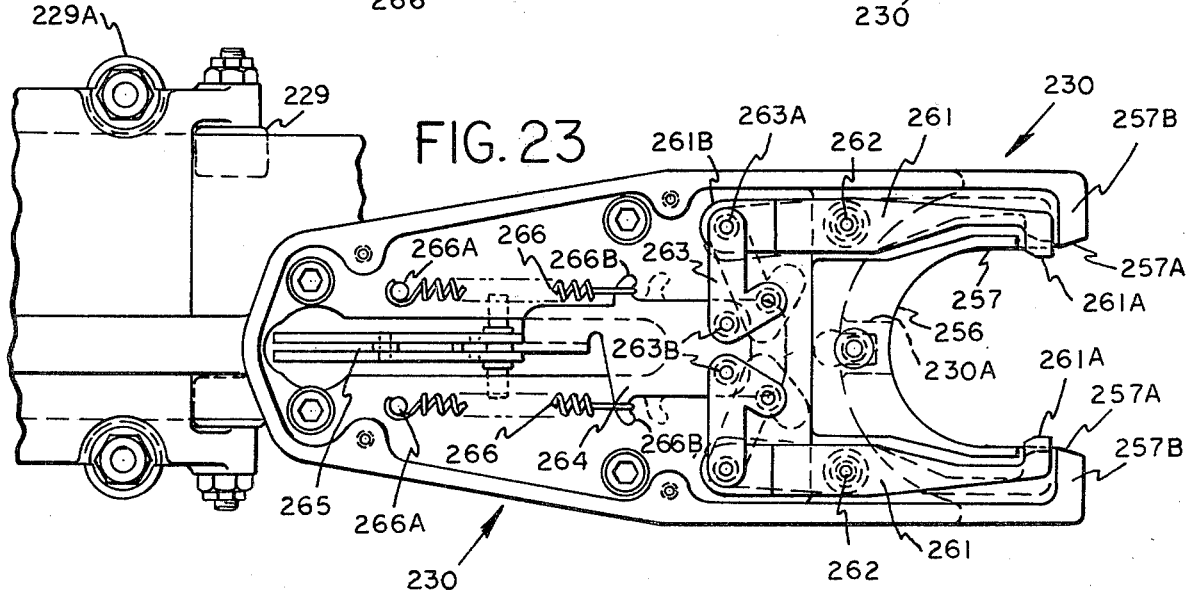

MACHINE TOOL

This invention relates to improvements in machine tools of the type having a rotatable spindle for releasably retaining a working tool, a storage rack for storing a number of various working tools, and a tool carriage or transport for selectively conveying a tool between the spindle and the storage rack for either manual or automatic or a predetermined programmed operation.

RELATED PATENTS

This invention more specifically is directed to improvements in machine tools of the type disclosed in U.S. Pat. Nos. 4,008,515; 4,008,518; 4,008,646; 4,008,647; and 3,467,177.

OBJECTS

An object of this invention is to provide an improved spindle drive assembly for effecting the drive of the spindle between a work performing position and a non-work performing position.

Another object of this invention is to provide an improved machine tool wherein the speed of the spindle can be readily varied during a work performing operation.

Another object resides in the provision of a machine tool in which the spindle drive is powered by an A.C. electric motor and the respective other component parts of the machine tool are sequentially operated by pneumatic actuators.

Another object is to provide an improved gear shifter for shifting the spindle between direct high speed drive and low speed back gear drive, or to a neutral position wherein the spindle is disengaged from its drive assembly.

Another object is to provide a machine tool capable of automatic operation having improved means for orienting the position of the spindle for receiving a selected tool.

Another object is to provide an improved spindle orienting assembly capable of providing the spindle with a jogging motion so as to facilitate the shifting of the spindle to its various positions.

Another object resides in the provision of an improved pneumatic drive for the tool transport or carriage for transporting a selected tool between the tool storage rack and the spindle.

Another object resides in the provision of an improved indexing assembly for indexing the tool storage rack.

Another object is to provide positive extraction of the tool holder from the spindle by the application of a relatively large force with virtually no impact.

Another object is to provide a reliable control arrangement for sequencing the operation of the machine tool for either manual, automatic or programmed operation.

SUMMARY OF INVENTION

The foregoing objects and other features and advantages are attained by a machine tool which comprises a spindle assembly, an associated tool rack adapted for storing thereon a number of various tools, and a transport or carriage for conveying a selected tool between the storage rack and the spindle. The spindle assembly comprises a quill for rotatably supporting therein the spindle; the quill having a drive for moving the spindle between a raised and lowered position relative to a workpiece. Operatively associated with the spindle is a variable speed drive which includes an A.C. motor, the drive shaft of which is drivingly connected to a spindle driving sleeve by a variable belt drive. An air motor is operatively connected to activate the variable belt drive for controlling the speed of the spindle during a work performing operation. A driven spindle sleeve is coupled to the spindle driving sleeve for relative movement so that the spindle driven sleeve can be readily engaged and disengaged from the spindle driving sleeve. To facilitate the shifting of the driven spindle sleeve relative to the driving spindle sleeve between an engaged driving position and a disengaged position, there is provided a gear shift assembly for shifting the spindle driven sleeve between a high speed direct drive and low speed back gear drive or to a neutral position in which the spindle is disengaged from its driving motor.

The gear shift assembly includes a gear shift sleeve which has connected thereto a bull gear which is normally biased toward high gear position by spring means. A pinion gear connected in driving relationship to the driving spindle sleeve is disposed adjacent to the bull gear to effect a reversal of the spindle rotation when the bull gear is brought into meshing relationship with the pinion gear in the shifted low gear position.

Included in the spindle assembly is a drawbar and push rod arrangement which are operative to releasably secure the selected tool to the spindle; whereby the drawbar is actuated to provide a positive force on the tool holder to free it from the spindle taper with virtually little, if any, impact.

Operatively associated with the spindle assembly is an orientation arrangement to effect orientation of the spindle for automatic operation of the machine tool, and which orientation arrangement can effect the jogging of the spindle necessary to effect the proper shift of the spindle between high and low gear, or neutral positions.

A tool storage rack is provided for containing a plurality of distinct tools adapted to be utilized with the spindle for performing various work operations on a workpiece. The tool storage rack is provided with an indexing mechanism to properly position the tool thereon for transfer between the tool rack and the spindle.

Operatively associated with the tool rack and the spindle is a tool transport or carrier for effecting the transfer of the tool from the tool rack to the spindle in a controlled continuous movement. To effect the drive of the carrier, there is provided a fluid motor drive which includes a closed fluid circuit for controlling the velocity of the carrier.

Controlling the sequencing of the various component parts of the machine tool is a circuit which renders the machine operative for either manual or automatic operation.

FEATURES

A feature of this invention resides in the provision of a machine tool in which an electric, motor driven, variable speed, drive is utilized to effect the drive of the spindle with the tool changes and other functions of the machine tool being air actuated.

Another feature resides in the provision of a machine tool having a spindle orientation mechanism which requires that the spindle drive be shifted into neutral to effect an automatic tool change.

Another feature resides in the provision of a spindle orientation mechanism which can be used for jogging the spindle during a gear shifting operation.

Another feature resides in an improved drawbar arrangement which is actuated by a relatively large positive force to free the tool holder from the spindle taper with virtually little, if any, impact.

Another feature resides in the provision of an air motor having a closed fluid circuit for controlling the drive of the tool carriage between the tool rack and the spindle.

Another feature resides in the improved electrical mechanical circuitry for sequencing the operation of the machine tool for either manual or automatic or predetermined programmed operation.

Other features and advantages will become more readily apparent when considered in view of the drawings and specification in which:

FIG. 7 is a plan view of the orientation and jogging mechanism taken along line 7—7 in FIG. 6.

FIGS. 8, 9 and 10 are fragmentary plan views of the spindle orientation means illustrating the various operating positions thereof; FIG. 8 shows the orientation means in the idle position; FIG. 9 shows the spindle oriented in operating position; and FIG. 10 shows the relative position of the parts at the end of the operation of the jogging means.

Figure 11:
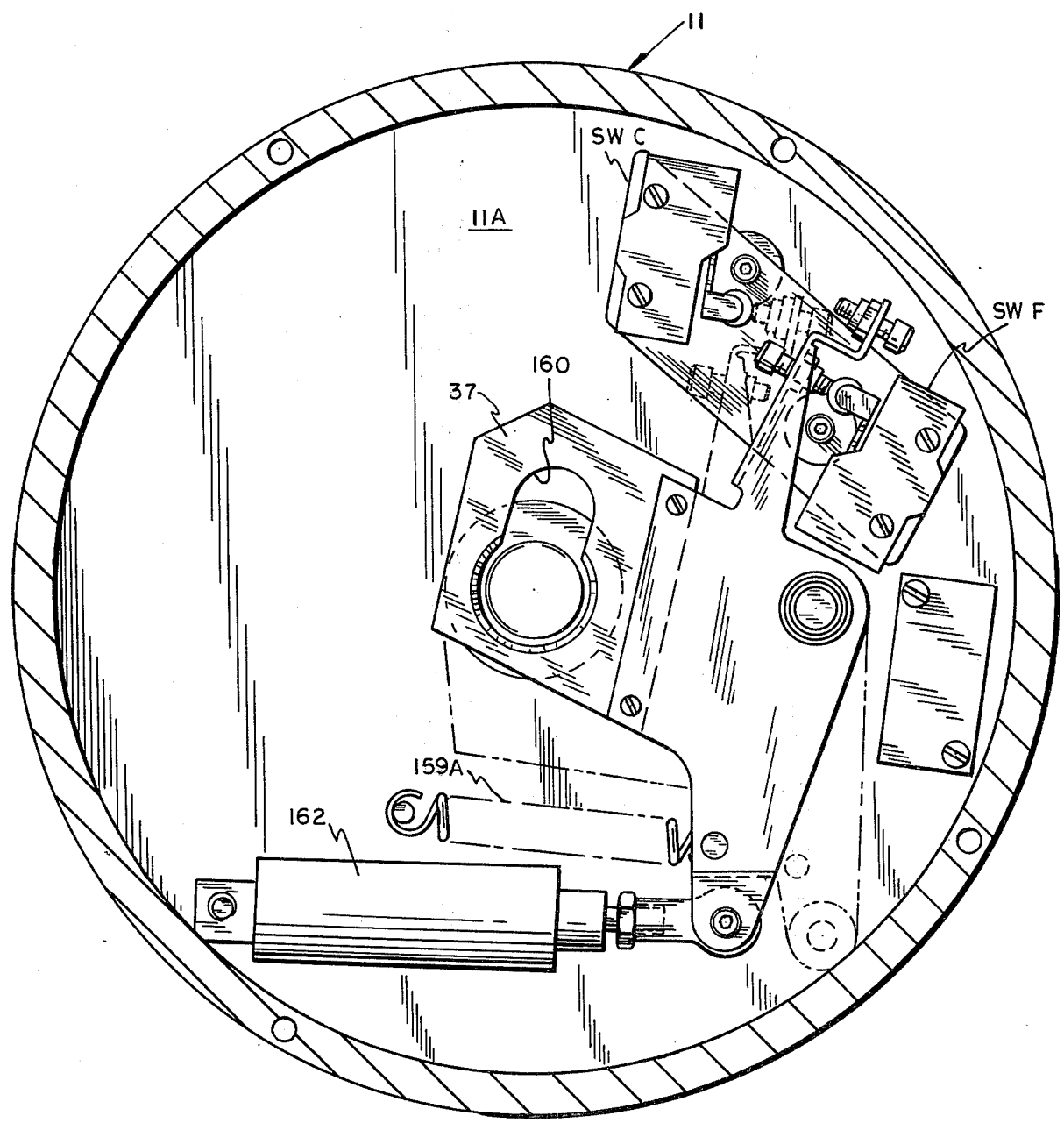

FIG. 11 is a detail plan view of the spindle locking or ground plate, and its operating means for releaseably locking the spindle against longitudinal movement.

FIG. 12 is a vertical sectional view illustrating the drawbar and push rod assembly of the spindle assembly.

FIG. 12A is a fragmentary external view of the orientation cup and associated driven gear.

FIG. 13 is an enlarged detailed sectional view of the retension end of the drawbar assembly with a tool adaptor secured thereto.

FIG. 14 is a detailed plan view taken along line 14—14 on FIG. 13.

FIG. 15 is a side view of the tool storage rack, its operating mechanism, and the associated carrier or tool transport.

FIG. 16 is a detail sectional view taken along line 16—16 on FIG. 15, showing the mounting arrangement of the driving arm and sprocket wheel.

Figure 17:
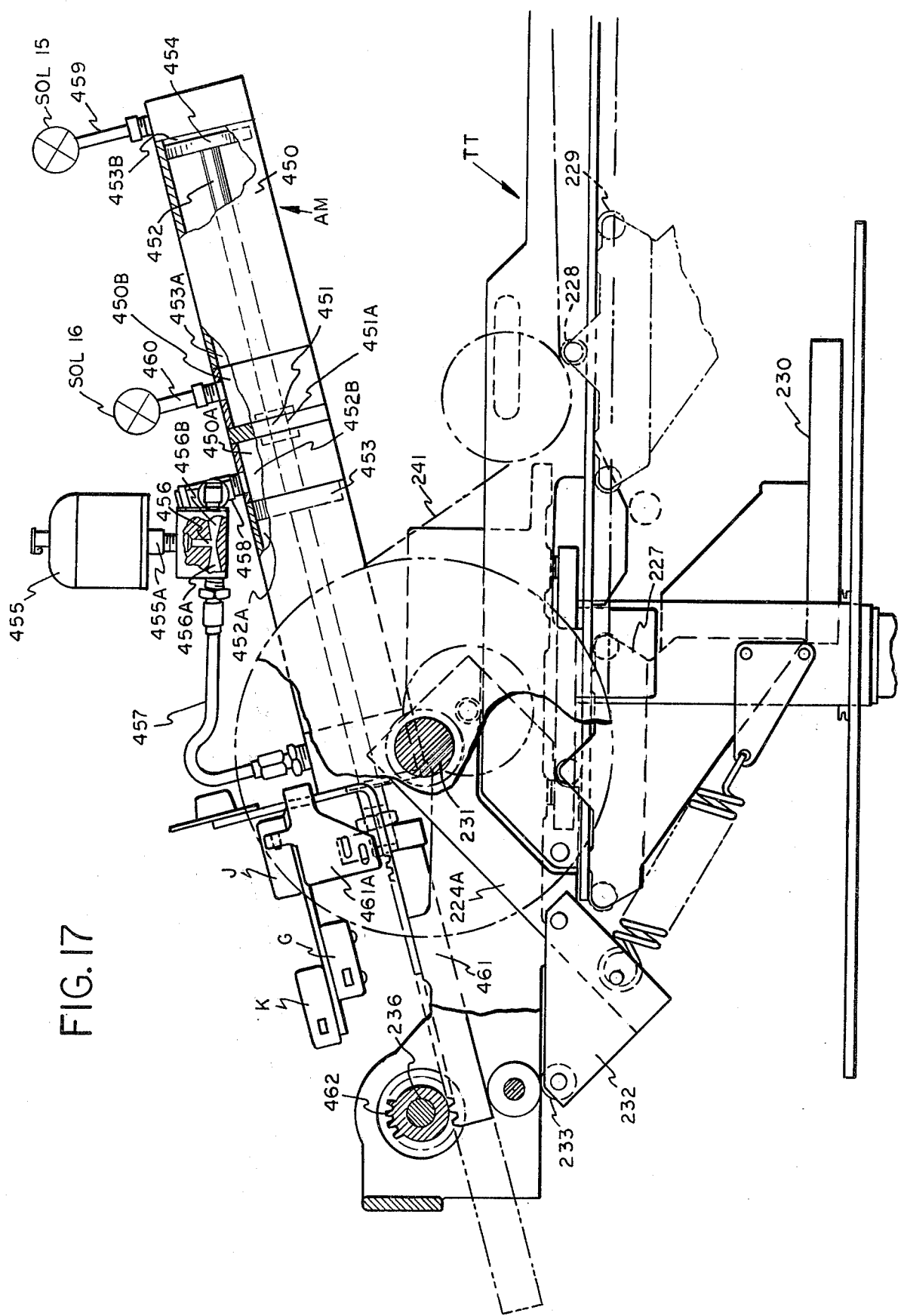

FIG. 17 is a side elevation view of the air motor drive for driving the carrier or transport to and from the spindle.

Figure 18:
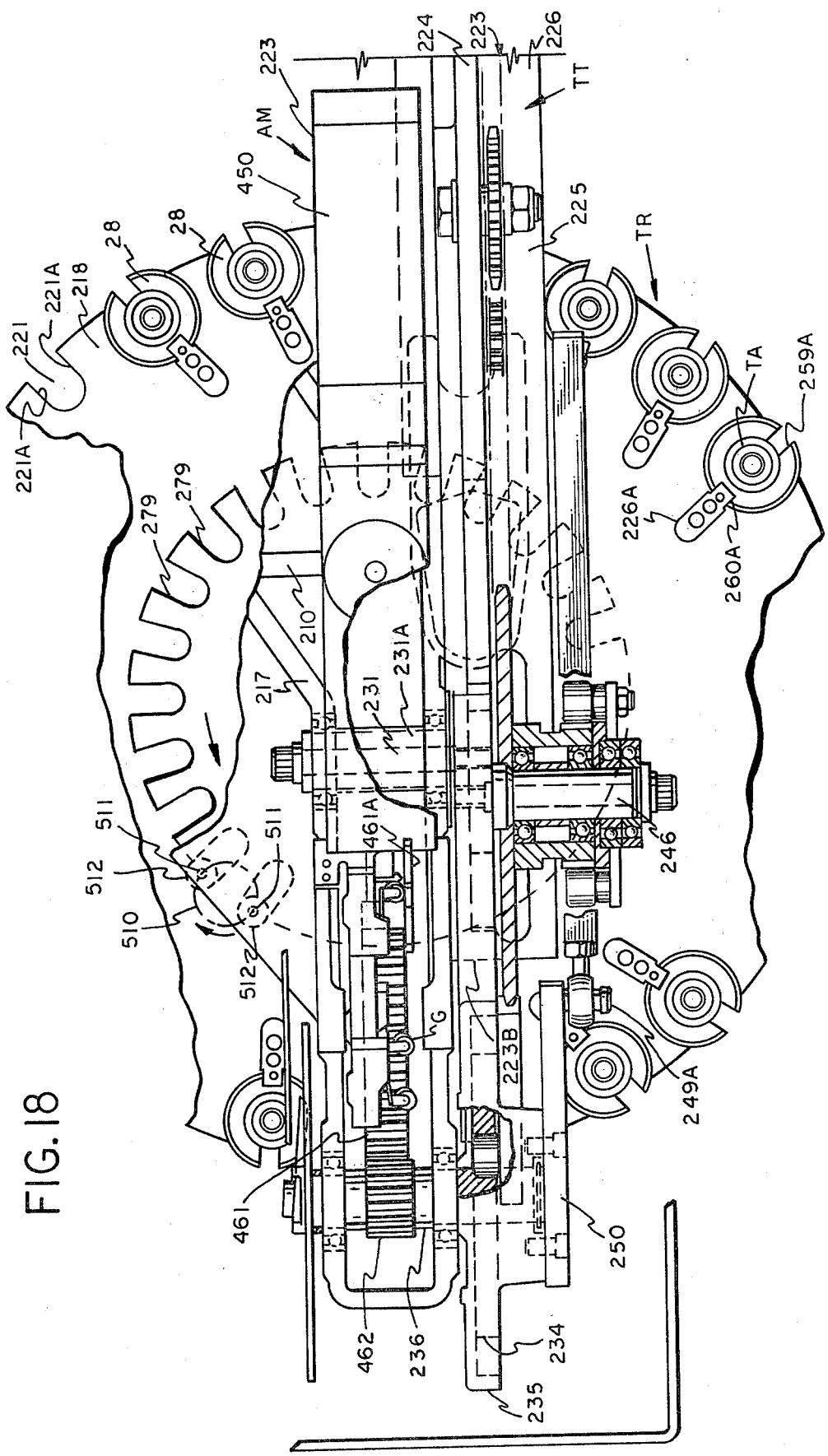

FIG. 18 is a plan view of the tool storage rack and associated carrier.

Figure 19:
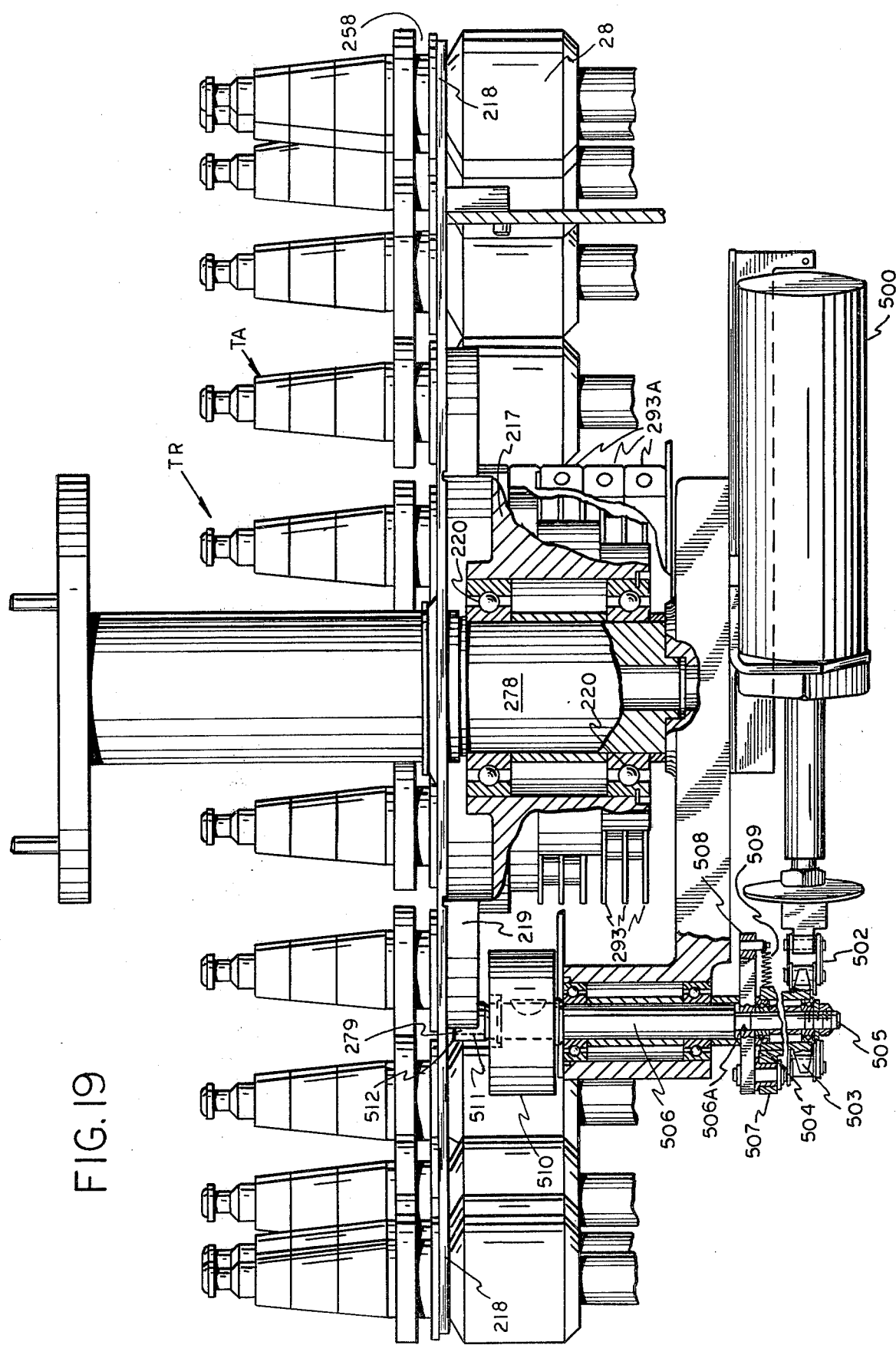

FIG. 19 is an enlarged side view of the tool storage rack having parts shown in section and showing the indexing means and cams moveable therewith for controlling the binary circuits by which the tool rack is actuated to locate a selected tool holder in position to be picked up by the carrier.

Figure 20:
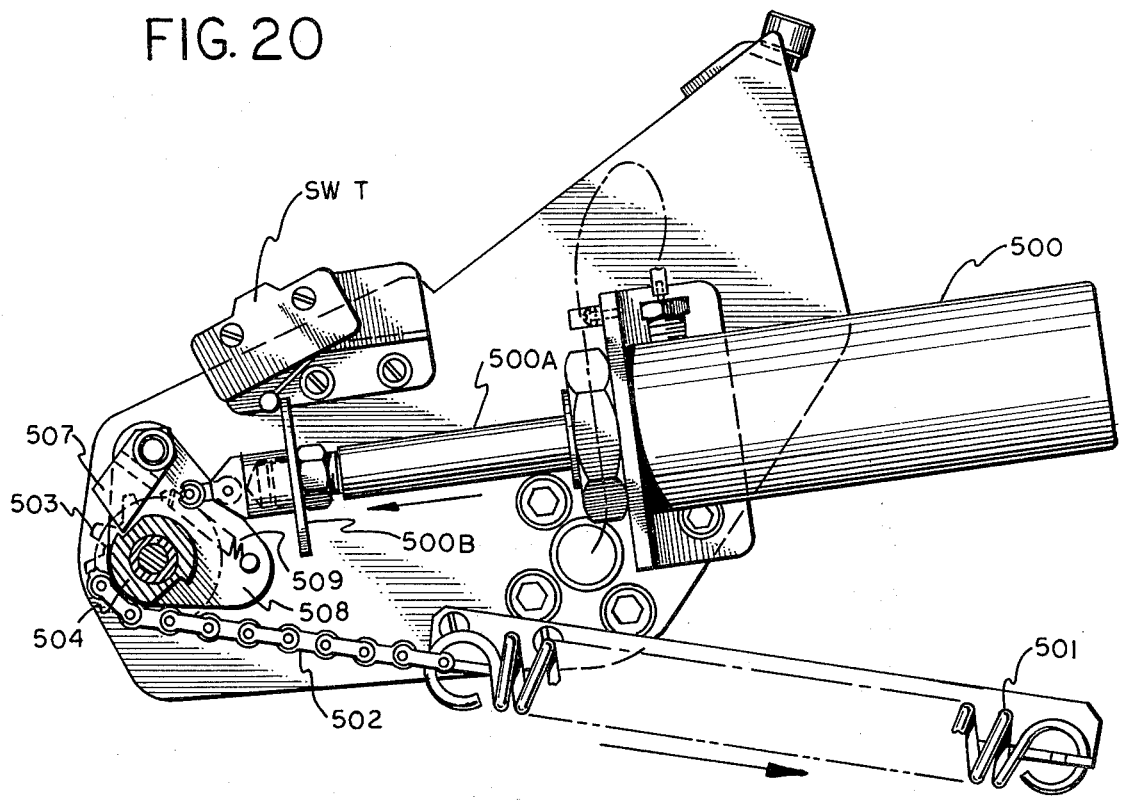

FIG. 20 is a plan view of a detail of construction of the indexing means for the tool storage rack.

Figure 20A:
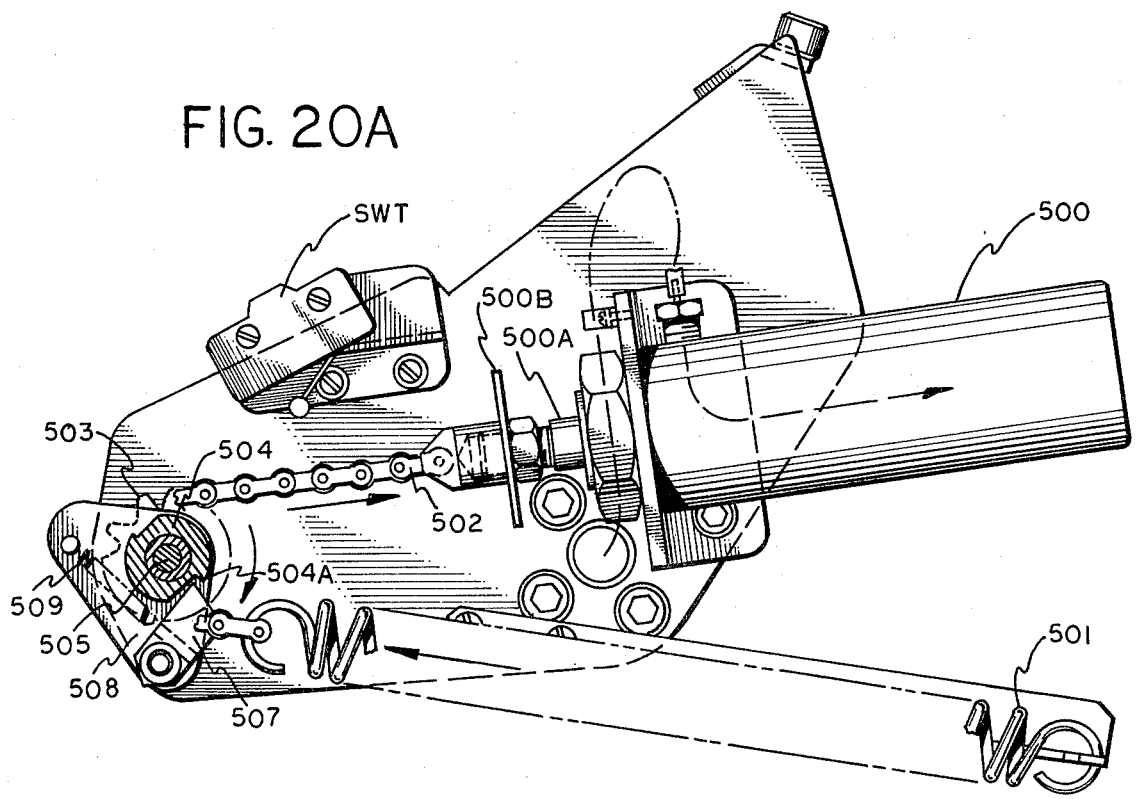

FIG. 20A is a plan view similar to FIG. 20, but showing the parts in an operative position.

FIG. 21 is a detail side elevation view of the hand portion of the carrier or transport shown in section to show the means for operating the hand.

FIG. 22 is a front end view of the hand of FIG. 21.

FIG. 23 is a bottom plan view of FIG. 21 with the bottom cover plate removed and showing in full lines the grasping hand with the fingers in tool holding position and in the dotted lines, the finger releasing position.

Figure 24:
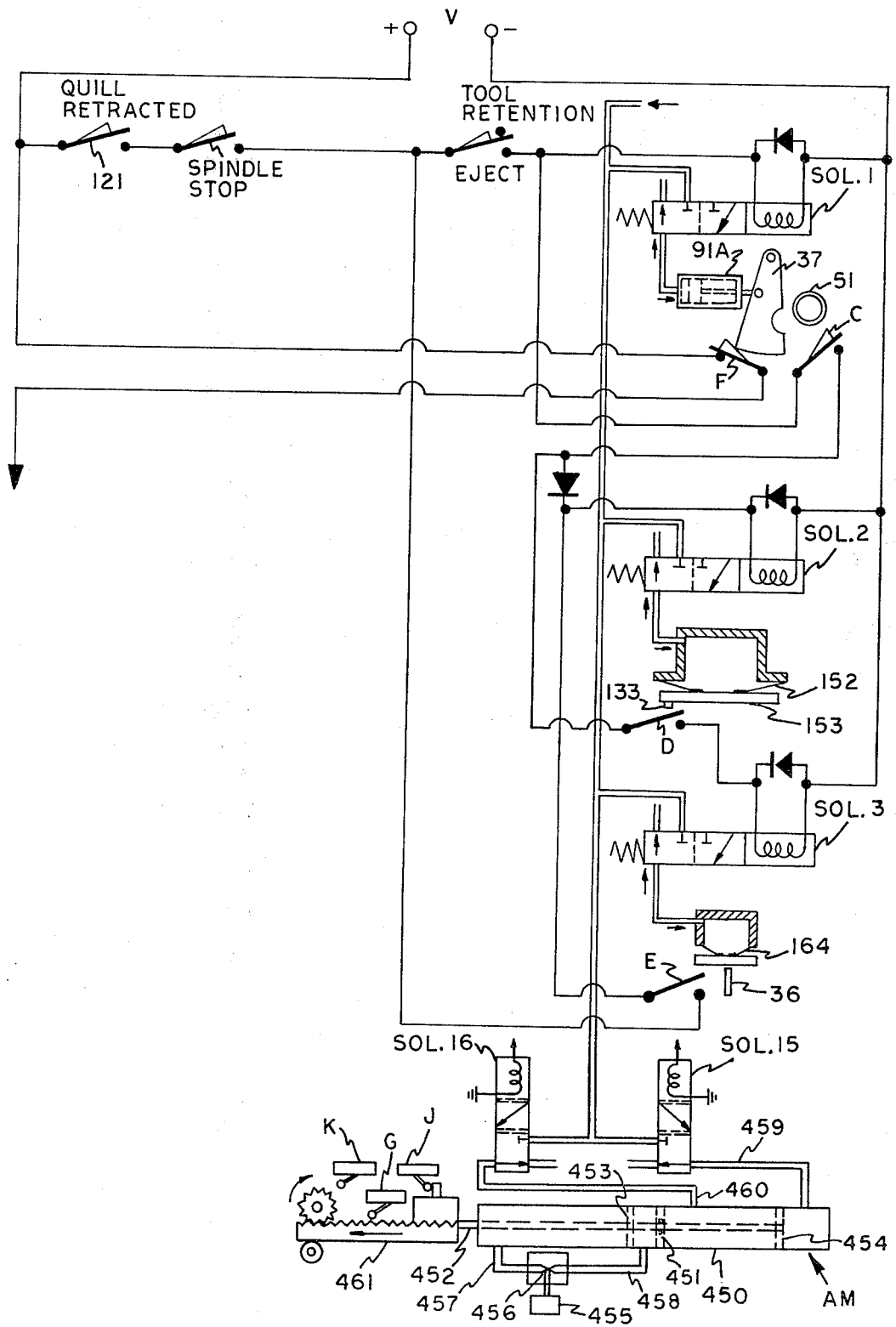

FIG. 24 is a schemmatic diagram showing the pneumatic controls for the components relating to the operation of the drawbar, push rod, and carrier drive.

Figure 25:
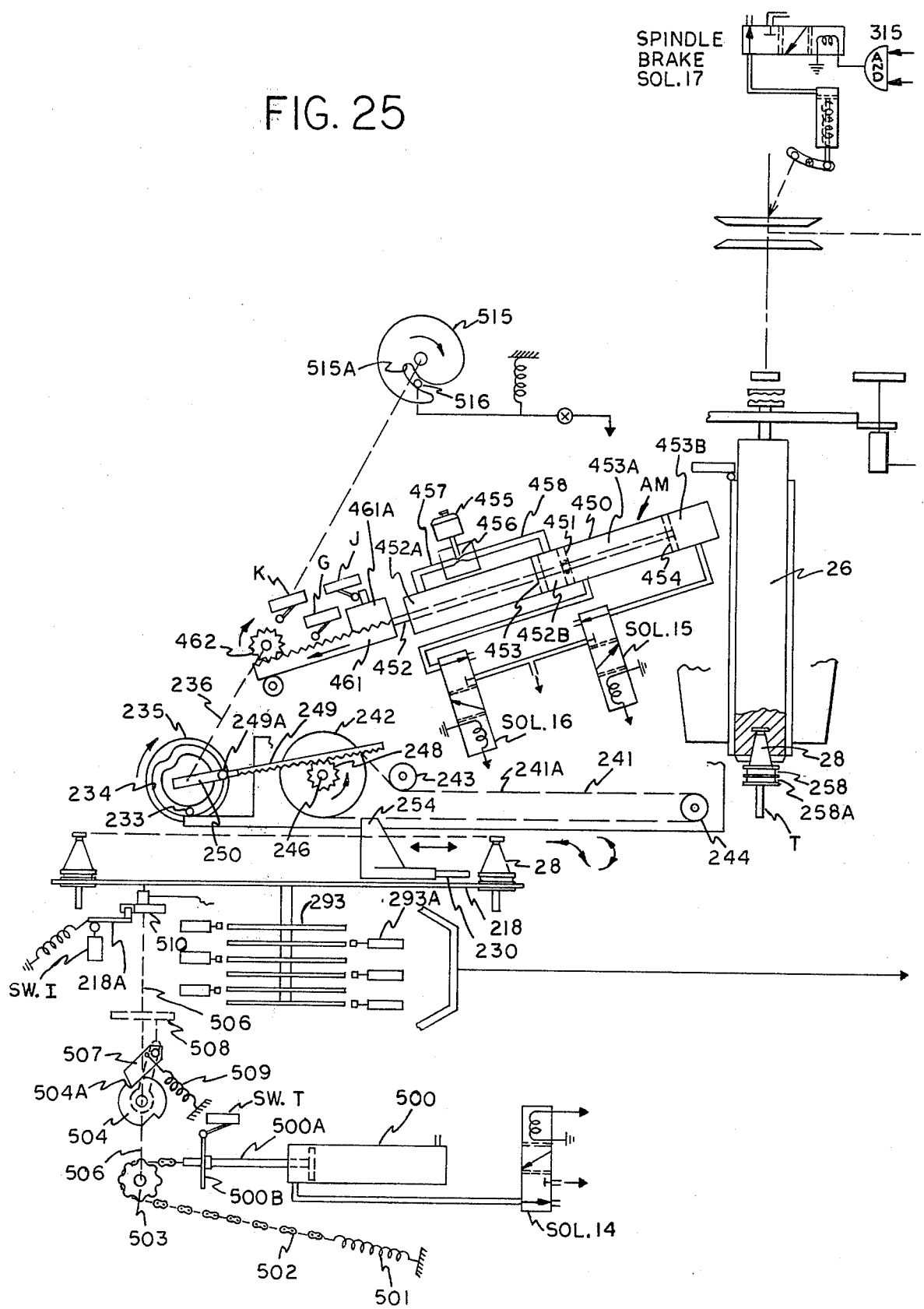

FIG. 25 is a schemmatic diagram of the tool changing mechanism relative to the spindle.

Figure 26:
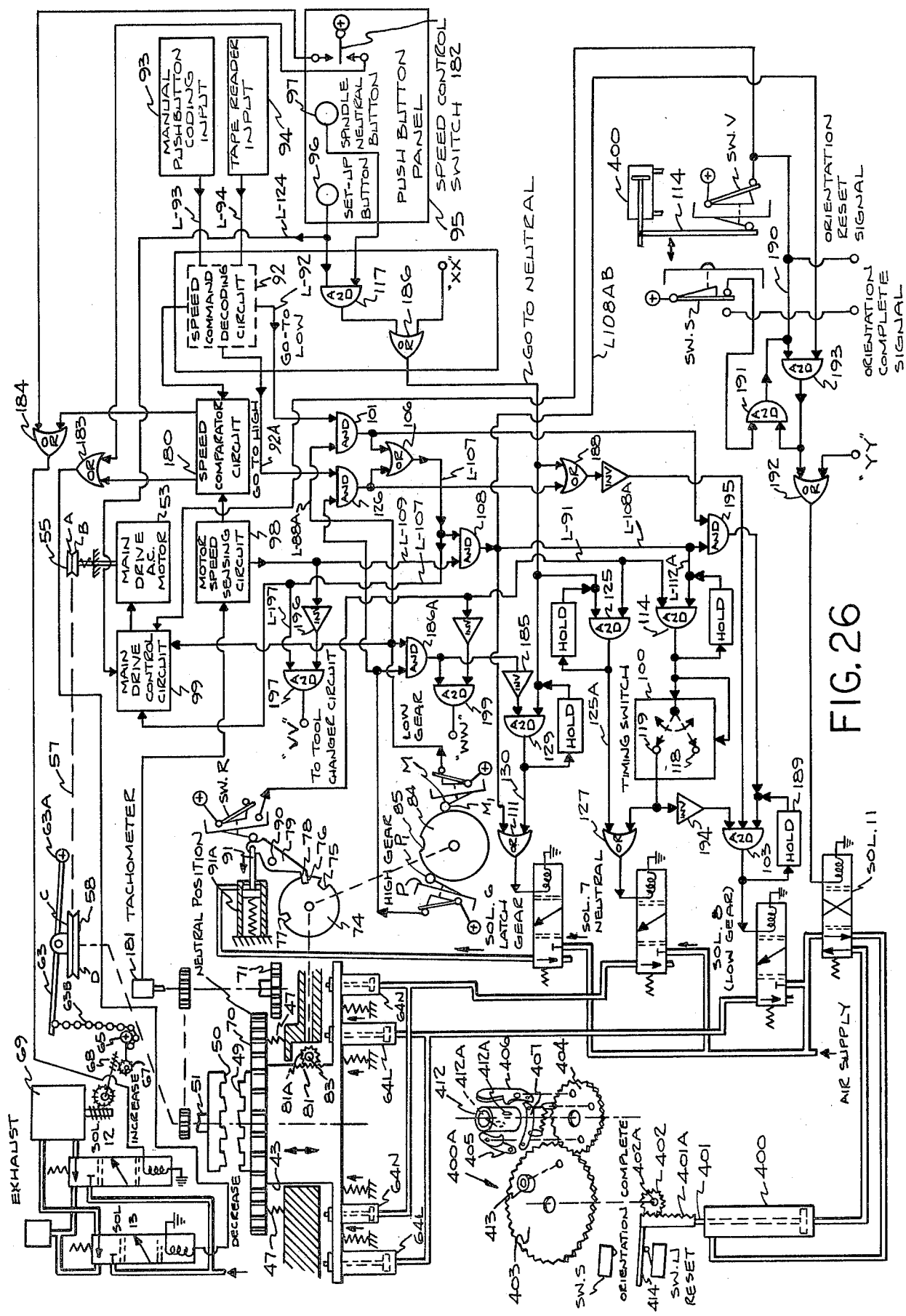

FIG. 26 is a schemmatic control diagram showing the electrical and pneumatic components relative to the spindle driving motor, the gear shift control and spindle orienting and jogging means.

Figure 27:
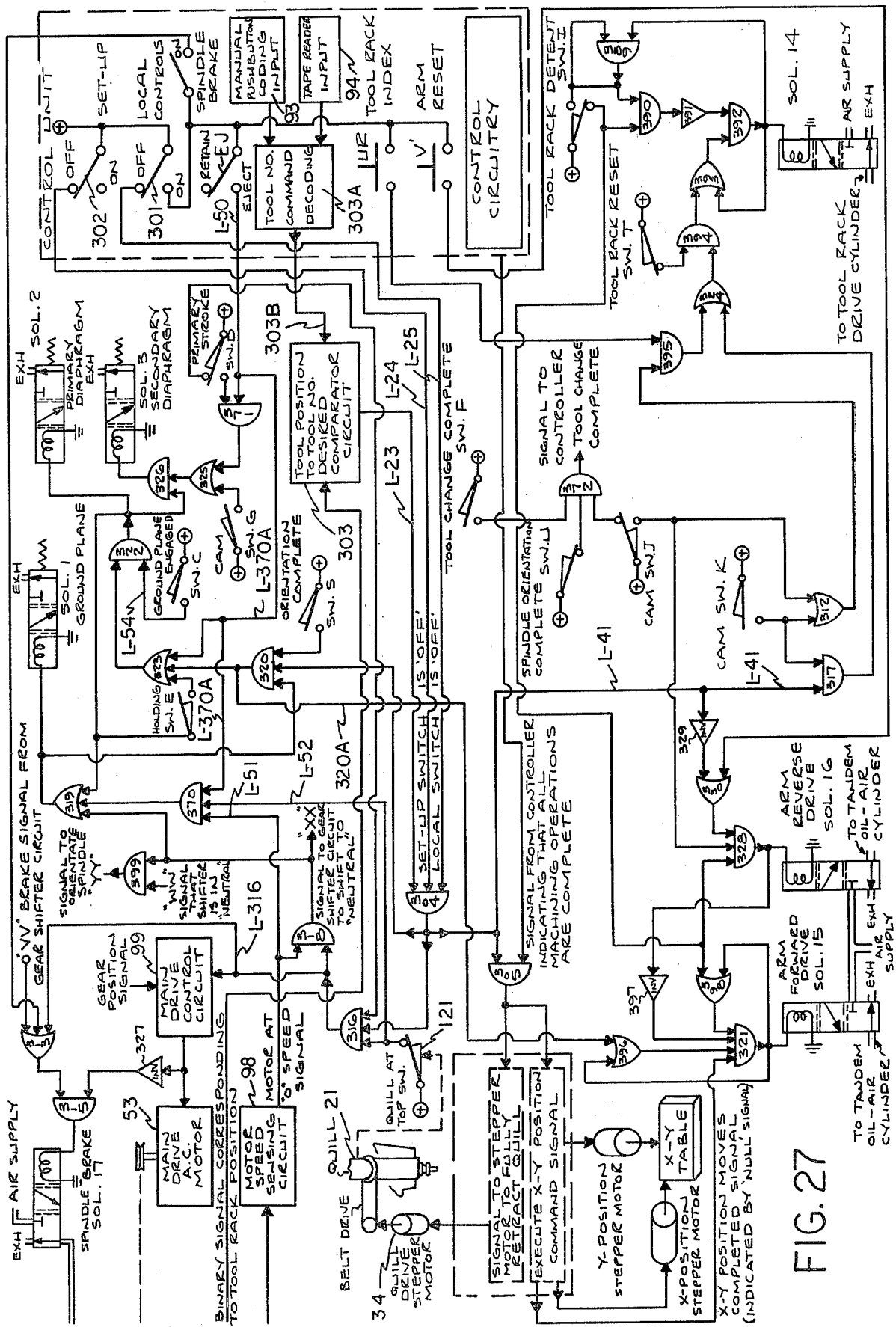

FIG. 27 is a schemmatic control diagram showing the various circuits and components to control the manual or program controlled operation of the spindle, storage rack, and carrier or transport and the various component parts thereof.

DETAILED SPECIFICATION

General Arrangement

The machine tool of the illustrated embodiment, as shown in the drawings, comprises essentially a spindle assembly (FIGS. 1 to 14) SA which is mounted on a suitable support for movement toward and away from a workpiece upon which a machining operation is to be performed. The spindle assembly SA is adapted to receive a tool adapter TA and an associated tool T. In accordance with this invention, a tool storage rack TR (FIGS. 18, 19) is remotely disposed from the spindle assembly SA for storing thereon a plurality of distinct tool adaptors TA and associated tools T. As will be hereinafter described, the tool storage rack TR includes a turntable which can be indexed so as to position a particular tool adaptor TA carried thereon into a position whereby the specified tool T and its adaptor TA can be transferred to the spindle assembly SA. To effect the transfer of a specified tool T between the tool rack TR and the spindle assembly SA, there is provided a transport carrier means TT (FIGS. 15, 17, 18). The carrier or transport means TT includes a track 't' upon which an arm 'a' is reciprocally mounted, the arm 'a' having a hand 'h' constructed for releaseably holding a tool adaptor TA and associated tool T to effect the transfer of the tool T between the tool rack TR and the spindle assembly SA. In accordance with this invention, an air motor AM is drivingly connected to the arm 'a' to effect the drive thereof in a continuous uninterrupted manner during a tool changing operation. The invention further contemplates an electrical pneumatic control circuit (FIGS. 24, 25, 26, and 27) for sequentially operating the respective component parts of the machine tool by which selective manual or automatic operation of the machine tool can be effected.

THE CONSTRUCTION DETAILS OF THE SPINDLE ASSEMBLY

Figure 1:
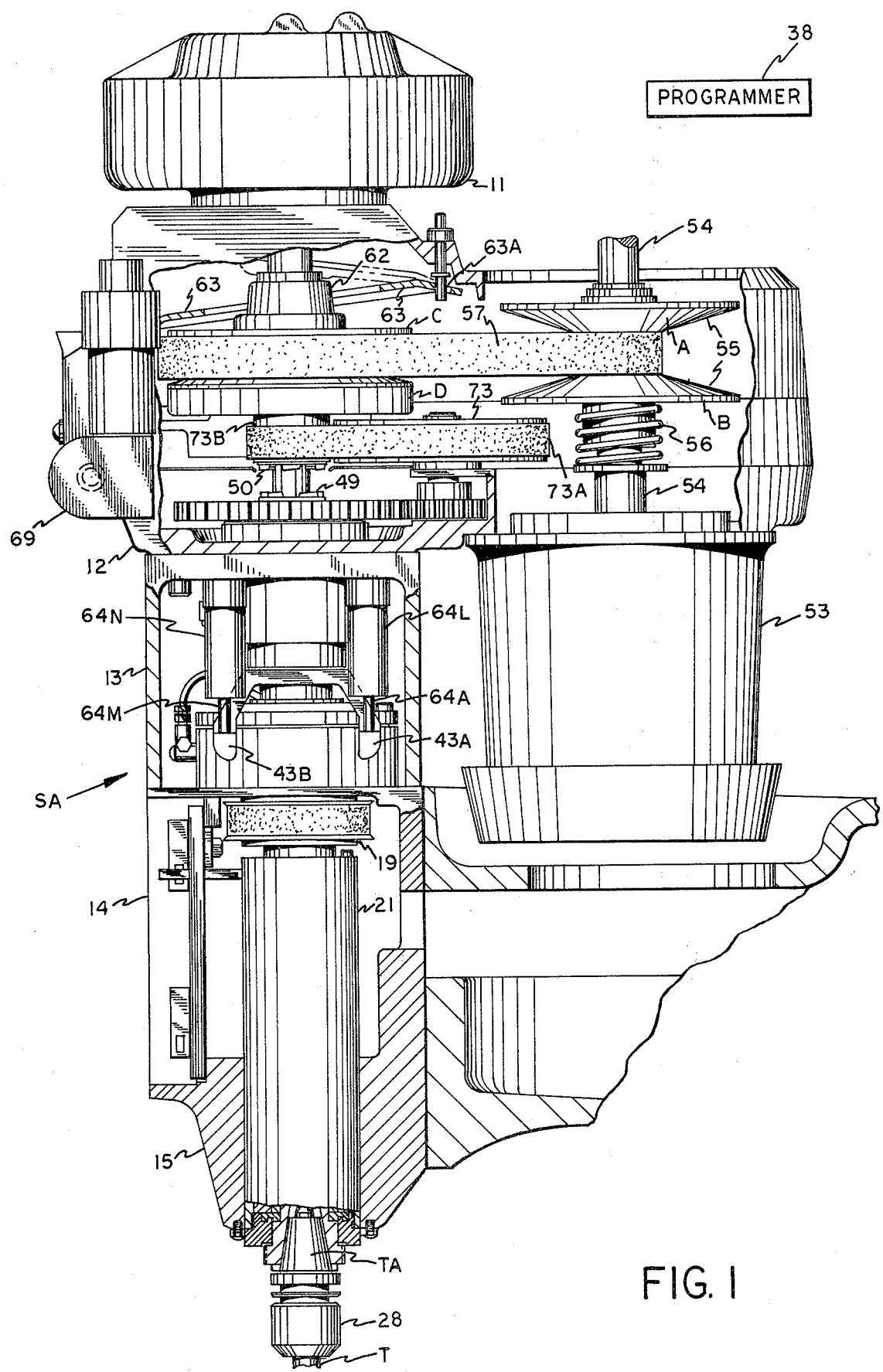
FIG. 1 is a vertical sectional view through the spindle assembly of the machine tool embodying the present invention and showing the variable speed spindle drive, with the spindle shifted in low gear wherein the back gear is in meshing relationship with the driving gear.

As best seen in FIG. 1 the spindle assembly SA comprises a frame or support made up of a plurality of stacked units 11, 12, 13 and 14 which define the housings or supports for the respective component parts of the spindle assembly. The respective stacked units 11, 12, 13, 14 are detachably secured together by suitable fasteners so that the stacked units can be readily assembled and disassembled to facilitate their manufacture and assembly; and/or for repairs or adjustments when necessary. As will be hereinafter described, the uppermost unit 11 (FIG. 6) of the stacked units defines the housing which contains the operating mechanism for operating the drawbar 35, the push rod 36, the ground plate 37, and orienting or jogging mechanism for the spindle 26, as will be hereinafter described.

The next to upper unit 12 (FIGS. 1 and 3) forms the housing for containing or supporting a variable speed motor drive for effecting the rotation of the spindle 26, and the gear members 70 and 71 of the spindle gear shift mechanism, part of which is housed in stacked unit 13.

Extending between units 13 and 14 is the quill 21 and quill actuating mechanism 34 for effecting the raising and lowering of the spindle 26 between an operative work performing operation and a raised non-work performing position.

Stacked unit 14 also defines the housing for the spindle 26 with the lower end 15 defining the bearing in which the quill 21 is guided between a raised and lowered position.

Figure 3:
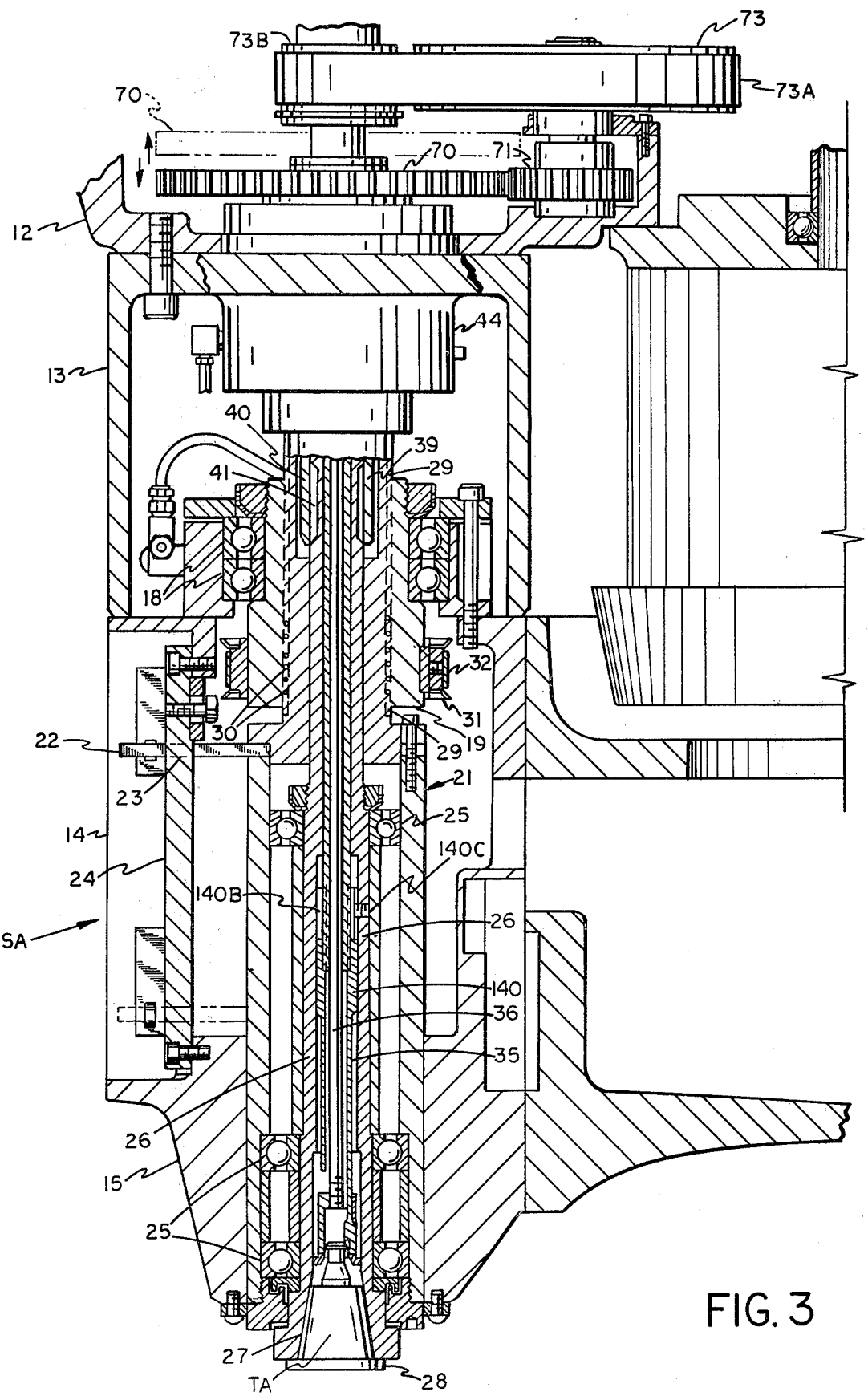
FIG. 3 is a vertical sectional view through a lower portion of the spindle assembly.

Referring to FIG. 3, there is mounted in bearings 18 located in unit 13, a quill nut 19 which extends between the units 13 and 14 and which, with the bearings 18, guides the quill 21 and associated spindle 26 in its vertical movements. Secured to the upper end of the quill 21 is a radially extending arm 22 having a slot 23 which engages a vertical rod 24 mounted in the unit 14 which functions to prevent the quill 21 from rotating, without restricting the vertical movements of the quill 21.

The quill 21 is tubular in construction. Mounted within the quill 21 for rotation between upper and lower ball bearings 25—25 is a spindle 26; the lower end of the spindle having a tapered socket 27 for releaseably receiving complementary tapered tool holder or adaptor 28 and associated tool T.

The spindle bearings 25—25 are so placed that the spindle 26 can rotate within the quill 21 and move axially or vertically with the quill 21 to carry a tool T to and from the work.

Figure 4:
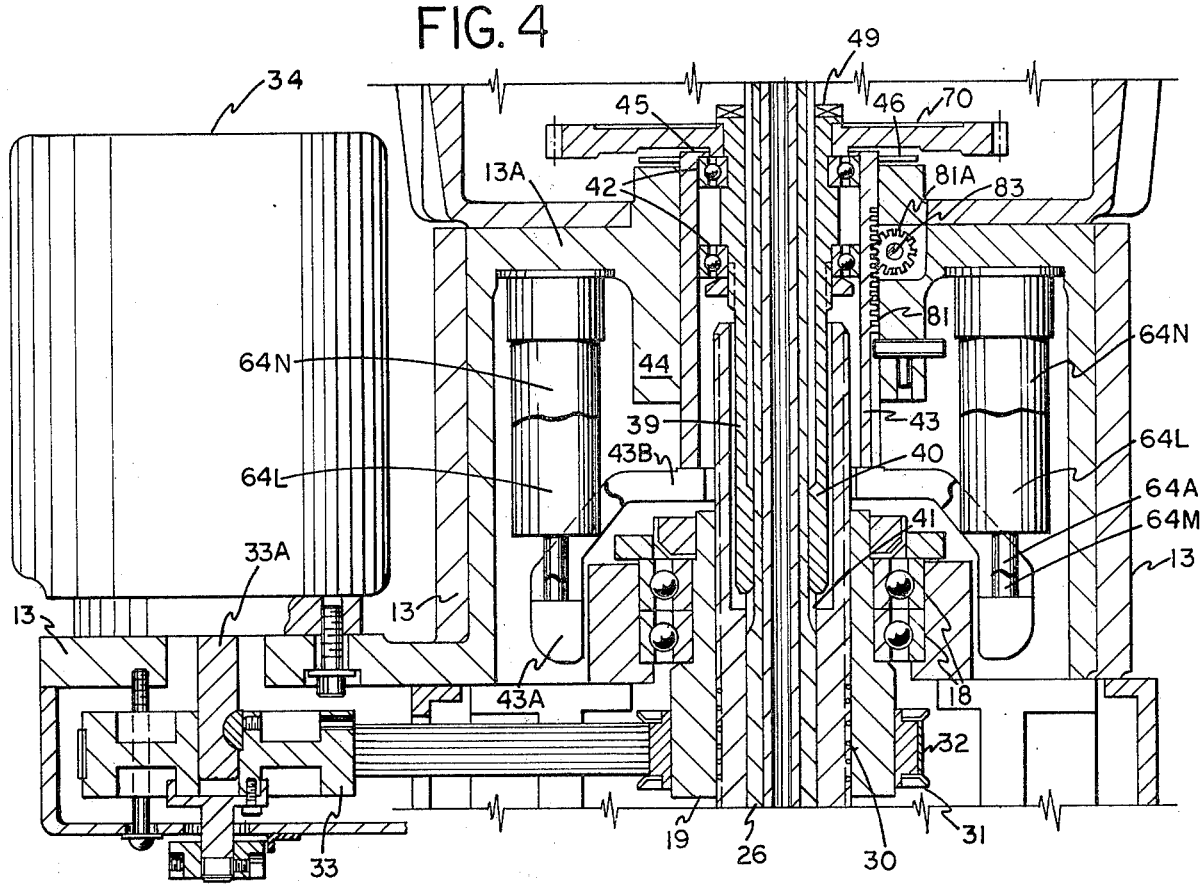
FIG. 4 is a vertical sectional view illustrating the details of the spindle gear shifting assembly and the quill drive.
Figure 5:
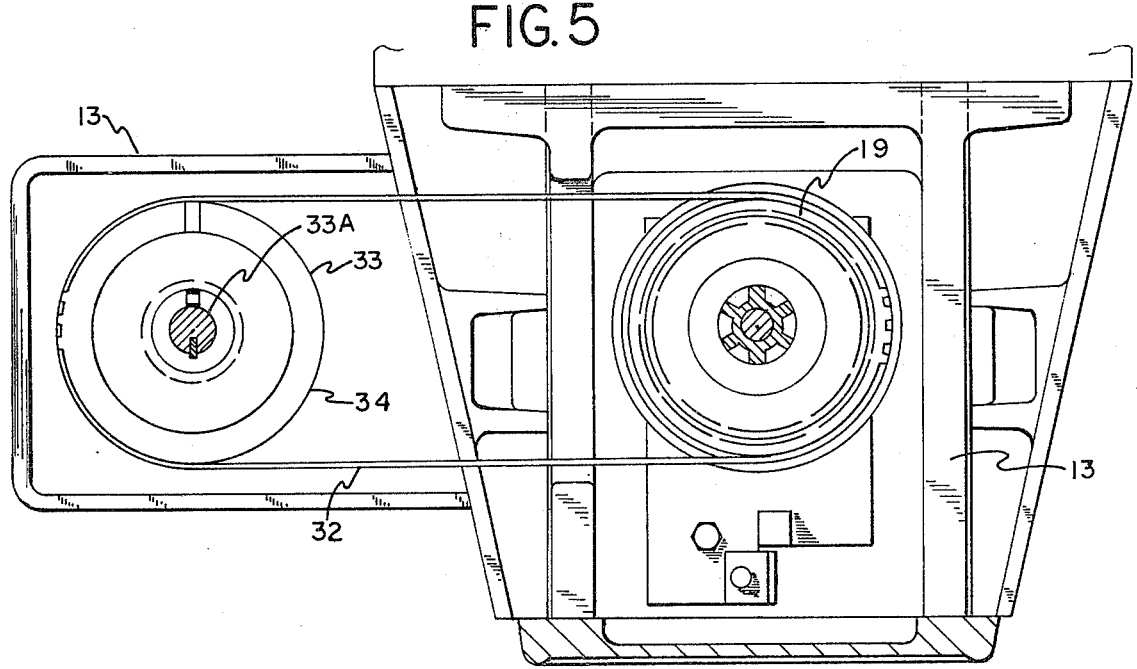
FIG. 5 is a plan view of FIG. 4 showing the quill nut, its pulley, and the quill motor drive with pulley and driving belt.
Figure 6:
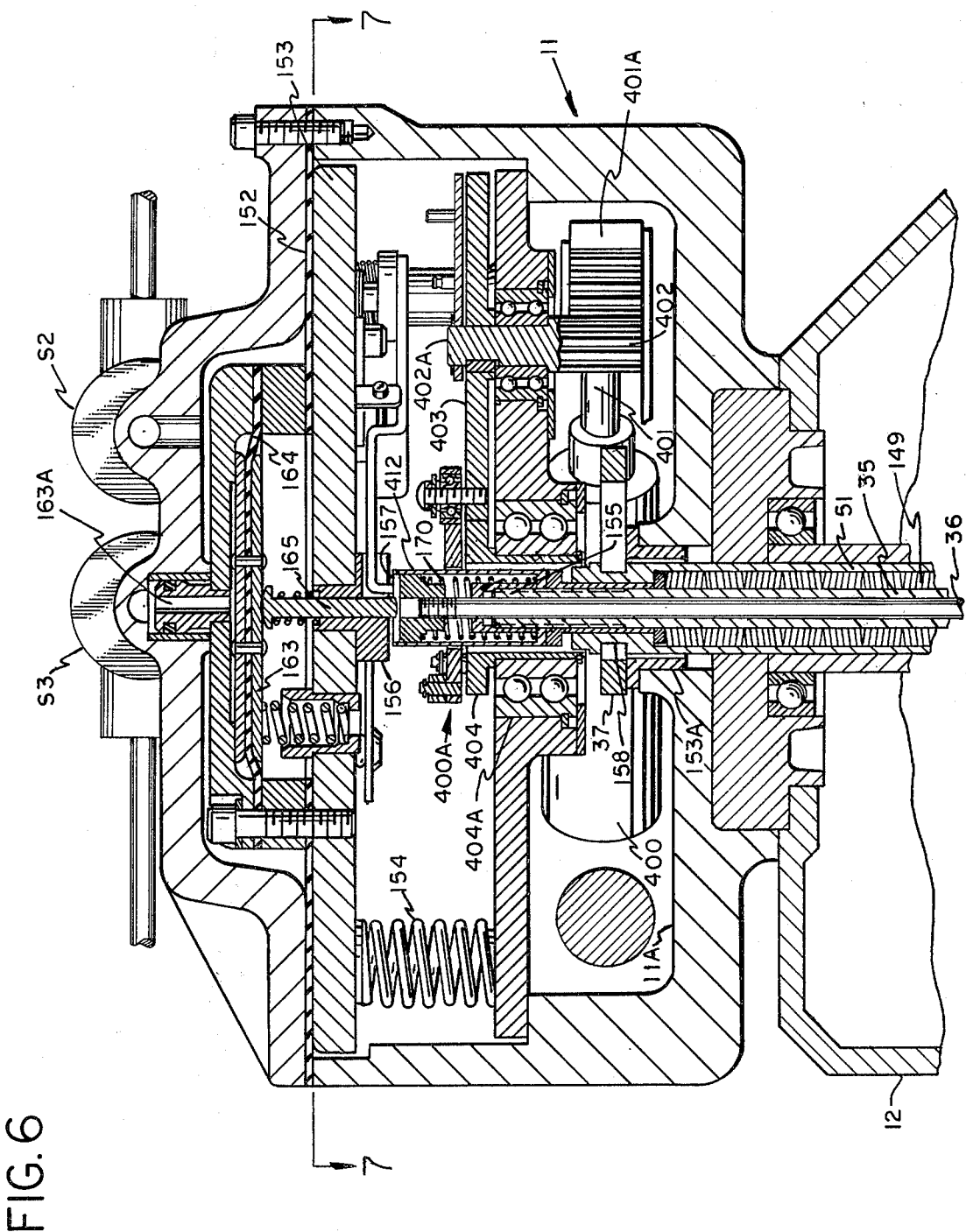
FIG. 6 is a vertical section view of the drawbar and push rod operating mechanism; and associated spindle orientation and jogging mechanism.

To raise or lower the quill 21 and associated spindle 26, the upper end of the quill 21 is provided with a circumscribing helical groove 29 forming a screw thread to receive balls 30 carried in a complementary groove formed in the quill nut 19. The outer portion of the quill nut 19 has a pulley 31 which is engaged by a non-slip belt 32 driven by a pulley 33 connected to the drive shaft 33A of a stepping motor 34, see FIG. 4 and FIG. 5, so that when the motor 34 is energized to rotate in one direction, the quill 21 will lower the spindle 26 with a tool T toward the work; and when the motor 34 is energized to rotate in the opposite direction, the quill 21, spindle 26 and tool T will be retracted from the work. The extent of movement of the quill 21 and hence the tool may be controlled manually for each tool by an operator or by programming means 38 in conjunction with upper and lower limit switches, as will be hereinafter set forth. As seen in FIG. 4, the stepping motor is supported by housing 13.

The drive means for the spindle 26 and associated tool holder 28 comprises a spindle driving sleeve 39 which extends co-axially of the spindle 26. The driving spindle sleeve 39 is coupled to the upper end of the spindle to effect rotation of the spindle 26 when the driving spindle sleeve 39 is actuated, and whereby the driving sleeve 39 can be readily moved independently of the spindle 26 while still remaining rotatably coupled in driving relationship with spindle 26. This is attained by providing the outer circumference of the spindle 26 with vertical grooves 41 and forming the driving sleeve 39 with complementary, longitudinally extending ribs or splines 40 arranged to mate with grooves 41.

Figure 2:
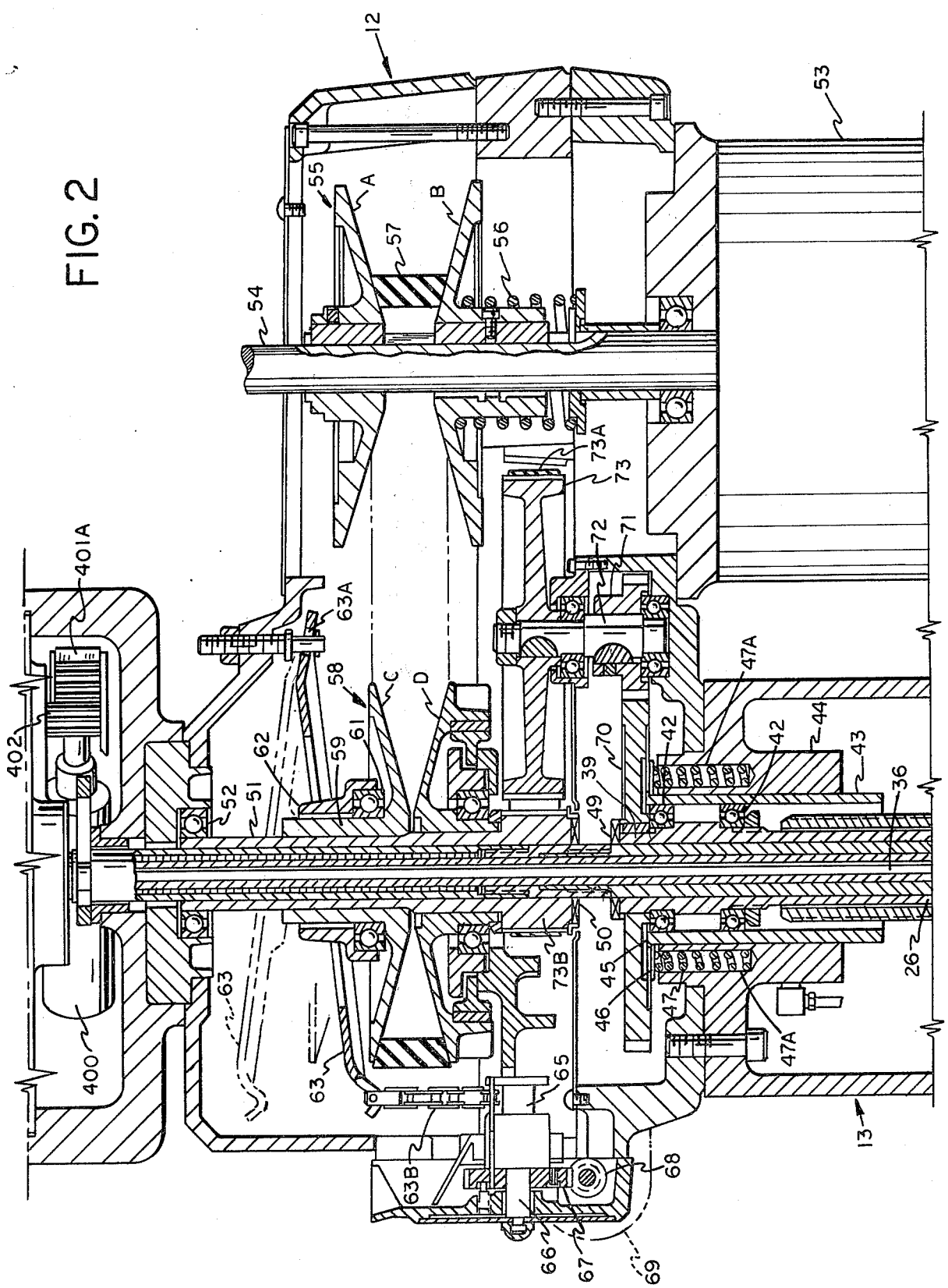
FIG. 2 is an enlarged vertical sectional view through an upper portion of the spindle assembly, the variable speed drive unit and gear shift mechanism.

The driving sleeve 39 is mounted in spaced ball bearings 42—42 (See FIG. 4) carried by a gear shift sleeve 43, which is mounted for vertical movement in a frame bearing 44 carried by the support unit 13, see FIGS. 2 and 4). The upper end of the gear shift sleeve 43 has a flange 45, see FIGS. 2 and 4, positioned to be engaged by a ring 46 which is engaged by a plurality of springs 47 located in spring cavities 47A formed in the bearing 44.

Under the force of the springs 47, the gear shift sleeve 43 is normally urged upwardly to cause teeth 49 carried by the spindle driving sleeve 39 to engage with teeth 50, (See FIGS. 1, 2, and 3) carried by the main spindle driving sleeve 51 which is rotatably mounted on bearings 52 carried on unit 12, to provide a drive for the spindle.

THE VARIABLE SPEED SPINDLE POWER SOURCE

As shown in FIG. 2, the spindle 26 is driven by power source comprising a main drive three-phase A.C. motor 53 having a shaft 54 connected to a variable speed drive means of a type illustrated in U.S. Pat. No. 3,467,177. The drive means comprise a pair of conical disks A and B forming an expandible pulley 55; the disk A being fixedly secured to shaft 54 of the motor 53 and the disk B being splined to, but slideable on shaft 54—the disk B being biased toward the disk A by the force of a spring 56. The disks A and B receive between them a drive belt 57 which is trained over a similar pulley 58 formed of spaced conical disks C and D—the disk C being connected to the spindle main driving sleeve 51 for movement relative to disk D, which is fixed to sleeve 51. The end of sleeve 51 is provided with clutch teeth 50 arranged to engage or disengage clutch teeth 49 on the spindle intermediate driving sleeve 39 which is splined to the spindle 26, as shown in FIG. 3.

The disk C of pulley 58 has a hub 59 slideably and rotatably mounted on the driving sleeve 51 and is connected by a bearing 61 to a collar 62 which is straddled by a slotted lever 63. Lever 63 is pivoted at 63A at one end and has its other end connected to a chain 63B. The other end of chain 63B is attached to a drum 65 mounted on a shaft 66. The shaft 66 carries a wormwheel 67 which engages a worm 68 which is rotated, according to the present invention, by an air motor 69 (see FIG. 26) to draw the disks C and D together or to allow them to move apart so as to vary the effective diameter of the drive pulley 58 and thereby to change the ratio of the speed between the motor 53 and the spindle 26.

The air motor 69, diagrammatically shown in FIG. 26, may be operated to increase or decrease the speed of the spindle manually or automatically under programmed control as will be hereinafter described.

BACK GEAR POSITION OF SPINDLE

To provide back gearing for the spindle 26, the gear shift sleeve 43 is moveably mounted to shift from a neutral position, wherein the clutch teeth 50 are disengaged from the clutch teeth 49, to a low speed position as shown in FIG. 2. In the low speed position, the back gear 70 is shifted downwardly to engage with a driving pinion or gear 71 of substantially small diameter. The driving gear 71 is journalled to a shft 72 to which a large pulley 73 is connected. Trained over pulley 73 is a driving belt 73A which is also trained over a driven pulley 73B formed by the hub of the spindle driving sleeve 51.

To effect the shifting of the gear shift sleeve 43 to the low speed or low gear position are a pair of piston and cylinder assemblies 64L—64L which are oppositely disposed to act on the shift sleeve 43. (See FIG. 4). As shown, the shift sleeve 43 is provided with opposed spider arms 43A as seen in FIG. 4. The piston rods 64A of the low gear piston assemblies 64L are connected to the extended ends of arms 43A. The base of the respective cylinders of the respective cylinder assemblies 64L are connected to the horizontal wall 13A of housing 13. The arrangement is such that the piston rods 64A are of such length that when the piston rods 64A are fully extended, the gear shift sleeve 43 will be forced downwardly against the bias of springs 47 causing the back gear 70 to be shifted into meshing relationship with gear 71 as shown in FIGS. 2 and 3. When this occurs, rotation or drive of the spindle 26 is transmitted from the main driving sleeve 51 through the belt drive 73A, pulleys 73, 73B; gear 71, gear 70 to effect the reversal of the rotation of the spindle 26 at a substantially reduced speed. The means for actuating the piston and cylinder assemblies 64L to effect the shifting of the gear shift sleeve 43 to neutral position will be hereinafter described.

NEUTRAL POSITION

To place the spindle in a neutral position wherein the spindle 26 is disconnected from driving relationship from the driving motor 53, there is provided a second pair of piston and cylinder assemblies 64N. Cylinder assemblies 64N are carried between a second pair of spider arms 43B connected to sleeve 43 and the horizontal wall 13A of housing 13. The piston rods 64M of cylinder assemblies 64N push against the ends of arms 43B and the base of the respective cylinders are connected to wall 13A. The piston rods 64M have a length sized so that when the assemblies 64N are activated, the full protracted position of the respective piston rods 64M will effect the displacement of the shift sleeve 43 downwardly against the pressure of springs 47 from its high gear position to an intermediate position between the high gear position of the back gear 70 and the low gear position of the back gear 70. In the intermediate or neutral position, the clutch teeth 49 are disengaged from clutch teeth 50 to disconnect the main spindle drive sleeve 51 from the intermediate spindle sleeve 39, and the back gear 70 is not in engagement with the gear 71. Thus the ability to effect disengagement of the spindle 26 from its driving motor 43 is advantageous for setting up or adjusting the positions of the parts of the spindle when orienting a tool relative to a workpiece, as will be hereinafter described. Controls, which will be hereinafter described, are provided for effecting the operation of cylinder assemblies 64N to shift the spindle to a neutral position, whereby the shifting can be effected either manually or automatically.

The cylinders 64N—64N like cylinders 64L—64L are oppositely disposed so as to counter balance the inertia forces in moving the gear shift sleeve 43 between high, low or neutral positions.

GEAR SHIFT LOCK MECHANISM

The gear shift sleeve 43 is provided with a locking mechanism whereby the gear shift sleeve 43 can be positively locked in either of the three gear shift positions of the spindle 26; i.e., in the high, low, or neutral positions, and which locking mechanism can be automatically controlled. The locking mechanism comprises a rack 81 extending longitudinally of the shift sleeve 43. (See FIG. 4). Meshing with rack 81 is a gear 81A which is journalled to a shaft 83. Secured to shaft 83 as schematically shown in FIG. 26 is a locking disk 74. The locking disk 74 is provided with spaced notches 75, 76, and 77 about the periphery thereof which are adapted to receive the locking tooth 78 of a locking pawl 79. The locking pawl 79 is pivoted at 90 and has its other end operatively connected to the piston rod 91 of an air operated cylinder 91A which is controlled by a locking disk solenoid SOL 6, as shown in FIG. 26. Notches 75, 76, 77 define the notches which lock the gear shift sleeve 43 in high, neutral or low gear, respectively, when engaged with the locking tooth 78 of locking pawl 79. For example, when the gear shift sleeve 43 is moved to a neutral position by the actuation of the neutral cylinder assemblies 64N—64N; the locking disk 74 is rotated to a position wherein the locking tooth 78 of pawl 79 engages the neutral holding slot 76, and thereby locks shaft 83 against rotation; and hence, the gear shift sleeve 43 against vertical movement. When the sleeve 43 is shifted to high gear position under the bias of spring 47, the rack 81 causes gear 81A and connected locking cam 74 to rotate causing the tooth 78 of pawl 79 to engage the high gear notch 77 to lock the sleeve 43 in its high gear position. When cylinder assemblies 64L—64L are actuated to shift the gear shift sleeve 43 downward to its low gear position; the rack and pinion 81 and 81A causes the locking disk 74 to be rotated so that the locking tooth 78 of pawl 79 engages the low gear locking notch 75. The locking pawl 79 is actuated by cylinder assembly 91A to effect disengagement of the pawl 79 from the respective locking notches 75, 76, or 77 of the locking disk 74 to permit the shift sleeve 43 to be shifted by the actuation of cylinder assemblies 64L—64L; 64N—64N; or springs 47.

To coordinate the shifting of the gear shift sleeve 43 with the other functions of the spindle unit, as will be described, there is provided a switch cam disk 84 journalled to rotate with the locking disk 74. The cam disk 84 is provided with a notch 85 to receive the feelers or rollers of either switches P or M (See FIG. 26), each of which is biased to move to an open circuit position when the respective switch rollers P or M moves into engagement with notch 85. The switch P and M are connected in a circuit to signal respectively that the gear shift sleeve 43 is in either a high or low gear position.

To sense the position of the locking pawl 79 for determining whether or not the control shaft 83 of the locking mechanism is locked or free, there is provided a switch R, as shown in FIG. 26, which is spring biased to a closed position when pawl 79 is in an unlocked position so as to signal this condition, as will be hereinafter described.

SPINDLE ORIENTING AND JOGGING MECHANISM

In order to orient the spindle 26 and the tool T carried thereby relative to the work or for effecting an automatic tool change operation, or to effect the jogging of the spindle 26 to facilitate the meshing of clutch teeth 49 and 50 during a gear shifting operation, as will be hereinafter described, there is provided an orientation and jogging mechanism 400A. Referring to FIG. 26 and FIGS. 6 to 10, the principal components of the orienting mechanism 400A are located on housing 11. The orienting mechanism comprises an activating cylinder 400, a piston rod 401 which has a gear rack 401A which is in permanent meshing relationship with a gear 402 journalled to shaft 402a which is keyed to a larger gear 403. The larger gear or driving gear 403 meshes with a driven gear 404 which is rotatably journalled in bearings 404A in unit 11. (See FIG. 6). Mounted on the driven gear 404 are two pawls 405, 406 that are interconnected by a link 407. The respective pawls 405, 406 are pivotally mounted on pins 405A, 406A in such a manner that under the force of a tension spring 408 tend to rotate toward the spindle so as to force their respective pawl teeth 409, 410 into engagement of a spindle orientation cup 412 which is drivingly connected to the upper end of the spindle driving sleeve 51.

In the normal positions of rest, the orientation cylinder piston rod 401 and its rack 401A are in a fully retracted position so that the piston rack 401A is locating the gears 403 and 404 in a position wherein the pawls disengaging roller 413, carried on gear 403, forces pawls 405 and 406 joined by link 407 to swing about their respective pivot 405A, 406A in such a manner as to be forced radially out of engagement with cup 412 so as to be completely clear of the cup 412. (See FIG. 8). When in this position, the rack 401A has attached thereto a member 414 that actuates an orientation reset switch U. (See FIG. 26).

Referring to FIGS. 7 to 10, a means is provided to positively limit the end position of the orientation stroke. This is attained by a stop pin 415 which is firmly held in a mount which supports the bearing 404A in which the driven gear 404 rides in. The stop pin 415 extends into an arcuate groove 415A cut or formed in the driven gear 403. The arrangement is such that when actuated, gear 403 will rotate until the pin 415 engages the end of the groove 415A. Thus, the relative engagement of the gear rack 401A with pinion gear 402 and associated gears 403 and 404 is such that the engagement of pin 415 with the end of the groove 415A will stop the rotation of the spindle cup 412 and all associated parts including the spindle 26 to a desired oriented position just before the orientation cylinder 400 has completed its stroke. This also will correspond to the actuation of an orientation complete switch SW-S, as will be hereinafter described and shown in FIG. 26. The stop pin 415 therefore provides for a positive and accurate determination of the orientation position of the spindle which is thereby rendered accurately repeatable. See FIG. 10.

A lock assembly is provided to facilitate the use of the orientation mechanism to "jog" the spindle during a gear shift operation as herein described. The lock assembly is carried by the driving gear 403. As shown in FIGS. 7 to 10, the lock assembly comprises a sector plate 420 which is pivoted about the center of rotation of gear 403. The arrangement is such that the lock assembly is rendered inactive when the orientation mechanism, described, is actuated to "jog" the spindle during a gear shifting operation. The lock disabling feature is attained by a bracket 421 that is attached to the ground plate 37. As will be described, when "jogging" the spindle for a gear shifting operation, the ground plate 37 is not activated. Therefore, when the driving gear 403 rotates the lock assembly; i.e., sector plate 420, the bracket 421 will intercept the sector plate 420 and stop its rotation well before the end of the travel of gear 403. For this reason, the sector plate or lock assembly 420 is prevented from progressing far enough to perform its basic function; viz., to prevent the pawls 405 and 406 from becoming disengaged from the spindle cup 412, during an orientation cycle. Note FIG. 10 which shows the pawls 405, 406 engaged and locked to the spindle cup 412 by the sector plate 420.

It will be noted that the spindle cup 412 is provided with opposed elongated slots 412A which are adapted to receive the pawl teeth 409 and 410 respectively when the pawls 405 and 406 are actuated to close onto the spindle cup. The slots 412A in the spindle cup 412 are offset axially so that only the proper engaging pawl teeth 409 or 410, which are correspondingly offset one to the other, will fall into engagement. In this way, there is no ambiguity problem created by using two pawls and two slots. Also, slots 412A are elongated sufficiently to allow for relative axial motion between the pawls 405, 406 and the cup 412 when the primary diaphram 152 pushes down on the cup 412 for tool removal, as will be herein described.

The basic function for the lock assembly 420 is to maintain pawls 405, 406 engaged with cup 412 at the end of the orientation cycle. The lock assembly is necessitated because the abrupt stopping action associated with the orientation cycle tries to disengage the pawls due to the inertia of the spindle and its associated parts. During the orientation cycle the lock 420 is allowed to function because the ground plate 37 is energized each time the spindle is oriented, as will be described. The ground plate 37 carries bracket 421, and, when activated, carries the bracket 421 to a position where the bracket 421 will not intercept the lock 420, until the lock 420 has progressed far enough to perform its locking operation; i.e., to prevent the pawls from disengaging the cup 412. (See FIG. 10). After the lock 420 has progressed sufficiently far to perform its function to lock the pawls 405, 406; contact between the bracket and lock assembly 420 is permitted. This contact comes only after the lock assembly has gone far enough to perform its function. This contact is permitted so that at the conclusion of a tool change cycle, the gear shifter mechanism gets the spindle back into gear before the orientation mechanism has withdrawn the lock assembly; then the subsequent release of the ground plate 37 will move the lock assembly from its pawl holding position relative to the spindle cup 412. In this way, the orientation actuator or cylinder 400 will be able to disengage the pawls from the cup 412 even though the spindle cannot be rotated by the actuator as the reverse action of the actuator will cam the pawl teeth 409, 419 out of the cup slots 412A.

The orientation cup 412, as best seen in FIG. 12, is fixed to the upper end of the drawbar 140 by a nut 140A. The drawbar 140 extends along the centerline of the spindle and is locked to the tool holding head by a nut 140B. Nut 140B is keyed to the spindle 26 by a pin 140C (See FIG. 3) or the like so that the rotation of cup 412 is transmitted to the spindle 26 via the drawbar 140. The key connection between the drawbar nut 140B permits relative axial movement between the drawbar and the spindle, while maintaining the drawbar keyed to rotate with the spindle for either jogging or orientation. (See FIG. 3).

DRAWBAR ASSEMBLY

In the form of this invention herein disclosed, a drawbar 140 is disposed within spindle 26, the lower enlarged end 141 of which fits in a cavity 142 in the lower end portion of the spindle 26 into which the tool holder 28 having an adaptor portion 143 extends when the tool holder 28 is seated in the tapered socket 27. The lower end 141 of the drawbar 140 has elongated slots 144, see FIG. 14, to define spring fingers 145, each finger having a notch 145A and a hook 146 positioned to receive and externally engage the head 147 of the adaptor portion 143 of the tool holder 28 when the latter is inserted in the tapered socket 27 in the end of the spindle. Spaced above the hook 146 to define the top of notch 145A is a projection 145B arranged to extend over the top of the adaptor 143.

The fingers 145 are resilient and are spring biased outwardly. They may be cammed to move inwardly so that finger hooks 146 extend into an annular groove 146A which defines an annular shoulder 148 on the adaptor so as to be engaged by finger hooks 146 on fingers 145, as can be noted in FIG. 13. After a tool holder 28 has been placed in the socket 27 and hooks 146 cammed inward, control apparatus referred to below is actuated to cause the drawbar 140 to be pulled inwardly of the spindle 26 and which movement seats the tool holder snugly in the tapered nose 27 of the spindle 26.

For this purpose, there is provided a powerful drawbar spring 149 which may comprise a stack of Belleville spring disks which are carried within an extension of drive sleeve 51 of the spindle 26 and surround the drawbar 140. One end of the spring 149 engages the upper end 26A of the spindle proper, while the other end engages a nut 151A threaded on the drawbar 140 to establish a powerful upward thrust on the drawbar 140. See FIG. 12.

Maximum drawbar pull is made available to retain the toolholder 28 in the spindle taper 27. The withdrawing of the finger hooks 146 away from the adapter 143 is provided by a means acting independently of the pulling force acting on the drawbar 140, so that it is only necessary to move the drawbar slightly to take the pressure of the finger hooks 146 off the adapter 143, and then to move the finger hooks 146 away from the adapter 143 by separate means to effect release of the adapter and tool, the operation of which requires comparatively little power.

In this illustrated invention, the power for moving the drawbar 140 against the force or bias of the drawbar spring 149 is derived from air under pressure passing through a solenoid controlled valve S2 to act on a primary diaphragm 152 which has a diaphragm plate 153 supported on weight-counterbalancing springs 154. The diaphragm plate 153 is preferably concentric with and directly above the upper end 155 of the drawbar 140 and has a flanged bushing 156 which, when the diaphragm 152 is depressed applies force which is transmitted to the upper end of the drawbar 140 through cup 412 to move the drawbar downwardly against the force of heavy spring 149 as bushing 156 engages the upper end 157 of the spindle cup 412. Drawbar 140 is moved just far enough, e.g., 3/32", to move the finger hooks 146 away from the annular shoulder 148 of the adapter and thus relieve the pressure of the finger hooks 146 on the adapter. (See FIG. 13.) The arrangement is such that the top of the notch 145A or projection 145B functions to push the tool adaptor away from the surface of the spindle taper 27 whereby the tool adaptor is still retained between the fingers 145, i.e., by the lower hook 146.

To avoid the pressure on the drawbar 140 loading the spindle bearings and causing the spindle 26 to move downwardly and not produce the desired relative movement between the drawbar 140 and spindle 26, the upper end of the spindle extension 51 is provided with an annular groove 158. A spindle restraining ground plate 37, herein referred to as locking plate, is pivotally mounted on the horizontal support 11A of the framework; and it has an arcuate slot 160, the edges of which engage the shoulder of the groove 158 when the locking plate is swung into the spindle groove 158. When the locking plate 37 is so swung, it holds the spindle 26 against downward movement. A circular hole 161 (See FIG. 11) in the locking plate is large enough to permit the upper end of the spindle extension 51 to pass through the plate 37 when the spindle is advanced from and returned to the upper limit of its movement when the locking plate is in an unlocked position.

The locking plate 37 is operated by a cylinder and piston assembly 162, see FIG. 11, under the control of tool ejection means described below. The extent of downward movement of the locking plate 37 and the spindle 26 is controlled by a bushing 153A in the support 11A which is precision formed to accurately locate the locking plate 37 and hence the spindle relative to the related parts in the spindle unit.

When the primary diaphragm plate 153 is activated by air under pressure passing through solenoid valve S2, the drawbar 140 will be depressed a slight amount which, according to the present invention, need be only sufficient to relieve the pressure of the finger hooks 146 from the head 147 of the adaptor 143 as shown in FIG. 12; and to push the adaptor free of the spindle taper. Thus the freeing of the adaptor from the taper 27 is effected without impact.

After this occurs, a secondary diaphragm plate 163, carried by a secondary diaphragm 164, which is secured to and carried by the diaphragm plate 153, is activated by air under pressure passing through solenoid valve S3 and tube or inlet 163A, to move downwardly causing a pin 165, slidably mounted in the flanged bushing 156 in the diaphragm plate 153, to engage and depress a push rod 36 which extends through the drawback 140 and into a cavity 142 at the lower end of the spindle 26.

The lower end 168 of the push rod carries a finger locking and releasing head 169, shown in FIG. 12, for locking and releasing the adaptor gripping finger hooks 146.

The locking and releasing head 16 on the push rod 36 defines a guide which has four depending bars 175 (See FIGS. 12 to 14) located in the slots 144 between drawbar fingers 145. At their lower ends of bars 175 there is connected to a ring or ramp 176. The ring 176 has an inclined surface 176A to engage inclined surfaces on the lock finger hooks 146 to bias the fingers 145 into a gripping position. As shown in FIGS. 12 and 13, the ring 176 is shown in a locking position retaining the tool to the drawbar.

To effect release of the tool, the actuation of the secondary diaphragm 164 effects the displacement of pin 165 which in turn transmits a downward force on the push rod 36, causing the locking ring 176 to release the spring finger 145 and thereby disengaging the hooks 146 from the tool adaptor 143.

From the foregoing, it will be noted that the extracting of the tool adaptor 28 with tool from the spindle 26 is effected by pushing the tool holder 28 free of the spindle taper 27 by the application of a relatively large force generated by the actuation of the primary diaphragm 152. The displacement of the diaphragm 152 releases the bias of the belleville springs 149 so that at the end of its movement, it imparts a high force with virtually zero impact to the tool holder. This force is transmitted down the drawbar 140 to the finger hooks 146, and then by projection 145B to the top of the tool holder 28. When the tool holder 28 is thus freed from the spindle, the tool holder will be slightly displaced from the spindle taper 27, e.g., 3/32", but still retained by the finger hooks 146. The subsequent operation of the secondary diaphragm 164 effects the displacement of the push rod 36 to shift the guide or head 169 downwardly relative to the finger hooks 146. In doing so the locking ring 176 is freed of the fingers 145 allowing the fingers 145 to spring radially outwardly to release the tool holder 28.

To retain a tool holder to the spindle 26, the cycle is reversed. That is, when the secondary diaphragm 164 is depressurized, the push rod 36 under the force of spring 170 drives the guide or head 169 of the push rod 36 axially upwardly relative to finger hooks 146. The camming action between the complementary surfaces 176A of the locking ring 176 and incline surfaces of hooks 146 will effect the closing of the hooks 146 onto the tool adaptor positioned in the spindle taper 27. When the primary diaphragm 152 is depressurized, the force thereof is removed from the drawbar 140 causing the Belleville springs 149 to drive the drawbar upwardly to thereby apply the holding force required to grip the tool holder 28 snugly up against the taper 27 of the spindle 26. With the tool holder 28 snugly in place against the spindle taper 27, the spindle is prepared for a machining operation.

OPERATION OF THE SPINDLE ASSEMBLY GEAR SHIFTER

FIG. 26 discloses schemmatically a combination mechanical electrical pneumatic and control logic circuit. The circuit of FIG. 26 shows the shifting gears 70, 71; the shift clutch comprising the teeth 50 on the main spindle driving member 51 and the teeth 49 on the intermediate spindle driving member 39; the cylinders 64L—64L and 64N—64N for shifting the gear sleeve 43 and gear 70 to either a low gear or neutral position from a high gear position to which the gear 70 is normally urged under the bias of springs 47. There is also shown the gear rack 81 on the gear sleeve 43, the rack pinion 81A, the locking cam 74, locking pawl 78, pawl actuator 91A, the pawl actuated switch R, the associated switch cam disk 84 and switches P and M actuated by the cam disk 84.

The circuit of FIG. 26 also shows a speed command decoding circuit 92, a manual push button unit 93, a tape reader input 94, a push button panel 95 having a set up enabling button 96, spindle neutral button 97, a speed control switch 182, motor speed sensing circuit 98 which includes a tachometer or other equivalent speed sensor 181, a main drive control circuit 99, a main motor drive 53, a timing switch 100, and leads operatively connecting them in circuit for sequential operation as will be herein described.

The sequence of gear shifting to either high or low gear may be initiated by manually inputting a speed code that requires a gear shift either by manual operation or by tape command. As will be herein described, when shifting to low gear; i.e., when gear 70 is shifted into meshing relationship with gear 71 to reverse the rotation of the spindle 26, the low gear solenoid SOL 8 will remain energized to assist in holding the unit in gear. The holding latch 79 will serve as a low gear memory when power has been disconnected.

Three switches are associated with the shifting circuit, viz., switches M., P., and R. Switches M and P are arranged in an arc about the switch cam 84. Switch cam 84 is coupled to the sliding gear change sleeve 43 so that the axial translation of the gear sleeve 43 position is indicated by the angular position of the latch cam 74 and switch cam 84 coupled to shaft 83. The switch cam 84 is phased with respect to the gear sleeve assembly 43 so that when the gear 70 is in its low gear position, the notch 85 on cam 84 is opposite the low gear switch M. When gear 70 is in high gear position, the notch 85 will be opposite the high gear switch P. In the neutral position of the gear sleeve 43, the notch 85 is disposed between the feelers of switches M and P; i.e., the switch rollers M' and P' are riding on the periphery of the switch cam 84. The third switch R is associated with the locking latch 79; which is operative to latch the gear shifter sleever 43 into one of three shift positions; viz., low gear, high gear, or neutral position. Thus the latch 79 provides a memory of the gear position even when air pressure or power is disconnected from the system, or if the associated gear shifting solenoid has been de-energized. The latch switch R senses that the latch 79 is fully engaged with one of the three notch positions 75, 76, 77 on cam 74 indicative of high, low or neutral position. Switch R is actuated by latch lever 79 which is air actuated by an air cylinder 91A coupled to latch 79.

SHIFT TO LOW GEAR SEQUENCE

With the back gear 70 in a high or neutral position, and a go-to-low gear signal is initiated by either a manual input in coding unit 93 or by the tape input 94 which is connected to the speed command decoding circuit 92 by leads L93 and L94 respectively; the main drive motor 53 is temporarily turned off. This is attained through the circuit which consists of the AND circuit 101 which receives the go-tolow signal from the speed command decoding circuit 92 by connected lead L-92. AND circuit 101 confirms the fact that low gear is desired and that the mechanism is not in low gear by the signal over wire L-88A connecting the low gear switch M to the AND circuit 101. The AND circuit 101 being thus energized, the signal goes through the OR circuit 106 to the main drive control circuit 99 by leads L-107 and also to the AND circuit 197 by lead L-197. The AND circuit 197 senses that the spindle 26 is not at "O"

speed through an inverter circuit 196, and thus sends a signal via terminal VV to the tool changer logic circuit. Referring to FIG. 27, the signal via terminal VV is directed to the spindle brake solenoid SOL-17 through the OR circuit 313 and connected AND circuit 315. The AND circuit 315 adds in the fact that the main drive control circuit 99 has de-energized the main drive motor 53. When this condition is sensed, the brake circuit is energized. The brake mechanism includes a solenoid valve SOL-17 which controls an air cylinder having a spring return to operate a brake lever which actuates the spindle brake 58 acting on the pulley D. See FIG. 2.

When the spindle 26 has been stopped, a "O" r.p.m. signal is put out by the motor speed sensing circuit 98, which turns off the brake signal because of the inverter circuit 196. Also, the release gear latch solenoid SOL-6 is energized through AND circuit 108 and OR circuit 111; the "O" r.p.m. signal input to the AND circuit 108 being through lead L-109. The solenoid valve SOL-6, when energized, directs air pressure to air cylinder 91A whose piston is attached to the locking latch 79. The movement of latch 79 causes it to be disengaged from the latched groove or notch 75 or 76 of the latch cam 74. Also, this action releases the latch engaged switch R. When switch R is thus actuated, a signal is sent to the AND circuit 114 over lead L-91 which AND circuit 114 already has a signal on its other input L-112A from AND circuit 108. When AND circuit 114 is thus activated, the timing switch cycle 100 is started. However, as the timing switch 100 output is initially at terminal 118, the input to the inverter circuit 194 is still zero, resulting in its output to AND circuit 103 being still affirmative; i.e., signal present.

At the same time, AND circuit 108 directs an input signal to AND circuit 195 over lead L-108A, which in turn enables the AND circuit 103. This energizes the low gear solenoid valve SOL 8 and creates a holding circuit. Solenoid valve SOL-8 supplies air to the two opposed low gear air cylinders 64L—64L to actuate the gear shifter 43. This results in axial movement of the bull gear 70 downwardly to mesh with gear 71.

Simultaneously, AND circuit 108 directs an input signal to AND circuit 193 by lead L-108AB. This in turn directs a signal to the spindle orientation solenoid SOL-11 by way of the OR circuit 192. When the solenoid valve SOL 11 is activated it supplies air to the orientation air cylinder 400 located in the housing 11 above the spindle assembly.

The primary function of cylinder 400 is to orient the spindle 26 when performing an automatic tool change operation. The cylinder assembly 400 has a rack gear 401A attached to its piston rod 401. The rack 401A in turn is in permanent meshing engagement with a pinion gear 402 whose shaft is keyed to the drive gear 403 which is meshing with a driven gear 404. As hereinbefore described, the driven gear 404 carries two pawls 405 and 406 that are linked together by a link 407. The pawls 405 and 406 are pivotally mounted on pins pressed into gear 404 in such a manner that under the influence of a tension spring 408, they tend to rotate in a radial direction so as to force their respective teeth 409 and 410 inwardly to engage with slots 412A in the orientation cup 412. In the normal rest position, the orientation cylinder 400, its rod 401 and rack 401A are fully retracted so that the pinion 402 is orienting the gears 403 and 404 in a position where the pawl disengaging roller 413, carried on gear 403, is forcing the pawl 406 to pivot about its pivot pin in such a manner so as to be forced radially out of engagement with the cup 412 with ample clearance therebetween. The other pawl 405 is likewise held clear of cup 412 due to the linkage 407 between pawls 405 and 406. See FIG. 8. In the retracted position of the rack 401A, the actuator member 414 carried thereby is positioned to actuate an orientation reset switch U.

When the orientation solenoid SOL 11 is energized, air is directed to cylinder 400 so as to extend its piston rod 401 and connected rack 401A, thereby effecting the rotation of gears 403 and 404. This action moves both roller 413 and pawl 406 to separate from each other to free the pawls 405 and 406 for engagement with cup 412 under the influence of spring 408.

When the pawls 405, 406 are rotated until their teeth 409 and 410 are opposite their respective slots 412A in cup 412, they will enter the slots 412A thus engaging the cup, which is keyed to the spindle air through the tool retaining drawbar. The actuation of cylinder 400 thus drives the spindle until the stop pin 415 engages the end of slots 415A in gear 403. See FIG. 10. It will be understood that the component parts are set up and adjusted so that this end point or the proper oriented position of the spindle is signaled by a switch actuator 414 activating a spindle orientation complete switch S. The spindle orientation movement described is the normal orientation cycle which must occur for every automatic tool change operation.

From the foregoing description of the orientation cycle, it will be noted that the spindle can also be jogged by the orientation mechanism once the gear shifting circuit energizes the spindle orientation solenoid SOL 11. However, in the case of gear shifting, the cycle is somewhat different. When the orientation cylinder 400 completes its forward or extended stroke and causes member 414 to operate the orientation complete switch S, and noting that the reset switch U is released as soon as cylinder 400 has started its motion; the input L-190 to AND circuit 193 will be interrupted, turning off its output and also de-energizing the orientation solenoid SOL 11. This causes the air supply to cylinder 400 to reverse, thereby retracting the rack 401A. This action results in the pawls 405 and 406 being disengaged from cup 412; and cylinder 400 continues to retract until reset switch U is again actuated to turn "on" AND circuit 193; which then re-energizes solenoid SOL 11 to again advance and re-engage the pawls with cup 412 to turn the spindle. In this way, the spindle is made to "jog" so as to effect proper alignment between clutch teeth 49 and 50 necessary to effect a gear change operation. The function of the AND circuit 191 is to keep AND circuit 193 active after reset switch U has been released until switch S is activated as explained.

From the foregoing, to shift to low gear, the spindle drive motor 53 is turned off and the spindle brake solenoid SOL 17 is energized. (FIG. 27). After sensing "O" r.p.m. of the spindle 26, the release gear latch solenoid SOL 6 is energized at the same time as the low gear solenoid SOL 8 is turned "on" and the brake solenoid SOL 17 is turned off. Also, the cycling of the spindle orientation solenoid SOL 11 is initiated. As the latch 79 is moved it releases switch R, and which action energizes a signal to AND circuit 114 which starts the functioning of the timing switch 100.

If the clutch teeth 49 and 50 are properly aligned, the low gear cylinders 64L—64L should drive the gear 70 into meshing relationship with gear 71 to complete the shift to low gear. However, should the clutch teeth 49 and 50 be misaligned thereby prohibiting the shift to low gear, then after a predetermined time interval; e.g., 2 seconds, the timing switch 100 operates to switch power to its other terminal 119 for a time interval; e.g., one second. This switch of power results in the energization of the neutral gear solenoid SOL 7 through OR gate 127 and which directs air to the neutral cylinders 64N—64N. At the same time, the inverter circuit 194 will turn off AND circuit 103 to de-energize the low gear solenoid SOL 8. Actuation of cylinders 64N—64N causes the gear sleeve 43 to go to a neutral position for about one second. All during this time, the spindle will be jogged intermittently to new positions by the orientation mechanism herein described.

At the end of the timing switch cycle of approximately one second, the terminal 119 will be once again disconnected and terminal 118 reconnected to power. When this occurs the neutral gear solenoid SOL 7 is de-energized and the low gear solenoid SOL 8 re-energized. The low gear cylinders 64L—64L are again actuated to lower the shift sleeve 43 to once again attempt to move gear 70 into mesh with gear 71. Accordingly, the strokes to neutral and then to low, as herein described, are repeated until the teeth of gears 70 and 71 are brought into alignment so that gears 70 and 71 can be brought into meshing relationship; the jogging action caused by the spindle orientation SOL 11 taking place independently but simultaneously.

When the gears 70 and 71 have been shifted to low gear, the shift completion will be indicated by the actuation of switch M; i.e., the switch roller M', will fall into notch 85 of the switch cam 84. When this occurs the output of AND circuit 101 is de-energized. This in sequence turns "off" AND circuits 108, 114, 195, 191, and 193 to result in de-energizing of the release gear latch solenoid SOL 6; the timing switch 100 and the spindle orientation solenoid SOL 11. The latch 79 is thus free to engage with the low gear notch 77 of the cam 74. However, it will be noted that because of the hold circuit 189, the low gear solenoid SOL 8 remains energized so that power is positively retained on the low gear cylinders 64L—64L.

When the orientation reset switch U has been reactivated to indicate that the pawls 405 and 406 are completely disengaged from cup 412 and the spindle; then the main drive control circuit 99 can be enabled to re-energize the main drive AC motor 53, as all other conditions are satisfied. With the shift to low gear accomplished, all the circuit functions return to their initial condition.

SHIFT TO HIGH GEAR SEQUENCE

With the gear 70 in its shifted low gear or neutral position, and go-to-high gear signal is initiated by either a manual push button coding input 93 or tape reader input 94 the appropriate signal is sent to the speed command decoding circuit 92. Again, as described with respect to the shift to low sequence, the first thing that occurs is than the main drive motor 53 is temporarily de-energized. This is accomplished in a manner similar to that described above, except that AND circuit 126 is used instead of AND circuit 101. Referring to FIG. 26, the go-to-high gear output L-92A is directed to AND circuit 126; and the output of the OR circuit 106 triggers the interruption of power to the main drive motor and the energization of the spindle brake solenoid SOL 17 by way of AND circuit 197. When the spindle speed has been reduced to "O" r.p.m., the brake SOL 17 is deactivated and the release gear latch solenoid SOL 6 is activated by AND circuit 108, which also initiates the spindle orientation cycling by energizing solenoid SOL 11 through AND circuit 193.

One output of the AND circuit 108 goes to AND circuit 114, and starts the timing switch 100 similar as above described. As neither the low gear solenoid 8 or the neutral gear solenoid is energized, the cylinders 64L—64L and 64N—64N are not pressurized. Therefore, when the release gear latch solenoid SOL 6 causes its cylinder 91A to activate the latch 79, the gear shift sleeve 43 will be urged by springs 47 to engage the clutch teeth 49 and 50 in high gear position. However, should it not be possible for clutch teeth 49 and 50 to mesh fully due to any misalignment thereof, then after a predetermined time interval; e.g., two seconds, the timing switch 100 actuates to switch power to terminal 119 for a time interval, e.g., one second. This action results in the energization of the neutral gear solenoid SOL 7, pressurizing its cylinders 64N—64N to drive the shift sleeve 43 to neutral. During this time, the spindle will be jogging by the hereinbefore described orientation mechanism.

At the end of the timing interval, switch 119 will be once again disconnected from power. This will cause neutral solenoid SOL 7 to de-energize, thus permitting springs 47 to drive the spindle shaft sleeve 43 upwardly so that clutch teeth 49 and 50 may engage, if properly oriented. The strokes between "neutral" and "high" are repeated until gears 49 and 50 mesh; the jogging action by the orientation mechanism taking place independently and generally simultaneously therewith.

When the gears 49 and 50 are meshed in the high gear position, switch P is actuated as the switch cam 84 will be rotated so that the switch P roller P' will fall in notch 85. When this occurs, the output of the AND circuit 126 is de-energized. This in sequence will turn off AND circuits 108, 114, 191, and 193; and which results in the de-energization of the release gear latch solenoid SOL 6, the timing switch 100 and the spindle orientation solenoid SOL 11. The latch 79 is then positioned to engage the high gear notch 75 of cam 74.

As in the low gear sequence, completion of the high shift sequence effects the actuation of the orientation reset switch U which will signal the motor drive circuit 99 that it can re-energize the main AC motor 53, all other conditions being satisfied.

SHIFT TO NEUTRAL SEQUENCE

With the spindle in either "high" or "low" gear, a go-to-neutral signal is initiated by first pressing the "set-up enable" push button 96 and then the spindle neutral push button 97 on the control panel 95. When the set-up enable button 96 is pushed, the spindle motor 53 is de-energized or turned off; the signal being sent by line L-124.

The circuit for the shift to neutral includes AND circuit 117 and the OR circuit 186 connecting with AND circuit 129 and 125. The output 130 of AND circuit 129 through OR circuit 111 energizes the gear release latch solenoid SOL 6 which causes latch 70 to release cam 74. The release movement of latch 79 actuates switch R to trigger AND circuit 125; the output 125A through the OR circuit 127 energizes the neutral solenoid valve SOL 7. The actuation of solenoid SOL 7 causes air pressure to activate the cylinders 64N—64N to move the gear shift sleeve 43 to its neutral position.

It is to be noted that if the system was initially in a "low" gear position with the low gear solenoid SOL 8 energized; then at the start of the operation, the go-to-neutral signal at OR circuit 188 would have turned "off" solenoid SOL 8. As there is no need to cycle the orientation mechanism in shifting to neutral solenoid SOL 11 is not activated.

When the latch 79 is disengaged from cam 74 upon actuation of cylinder 91A and the shift sleeve 43 starts to move, the switch cam 84 will rotate causing both switches M and P to be activated; i.e., the rollers M' and P' of the switches are on the periphery of cam 84 and not in the notch 85. This signals the AND circuit 186A to turn "off" with AND circuit 129 and the release gear latch solenoid SOL 6 actuated by way of the inverter circuit 185. Thus the latch 79 is released to ride on cam 74 until it is opposite notch 76 thereby arresting any further movement of the gear shift sleeve 43. The subsequent actuation of switch R by latch 79 will de-energize AND circuit 125 and neutral gear solenoid SOL 7. The shift to "neutral" is thus executed and all solenoids and associated air cylinders are de-activated, and latch 79 serves for holding the shift sleeve 43 in neutral.

SPINDLE SPEED CHANGE CIRCUIT

Referring to FIG. 26, the circuit provides for the changing of spindle speed from code signals put into the system by manual push button control 93 or by tape command control 94. In addition, it is also possible to increase or decrease spindle speed by a manual switch 182 on the push button panel 95.

The speed change mechanism comprises an air motor 69 coupled by a worm gear reduction 68 to a speed adjusting shaft 67 for controlling the variable speed drive assembly herein described and shown on FIGS. 2 and 26. The spindle speed is controlled by an increase speed solenoid SOL 12 and a decrease speed solenoid SOL 13. The manual increase-decrease speed switch 182 is provided and used when the main drive AC motor is operating. Switch 182 connects to the appropriate speed control solenoids SOL 12 and SOL 13 through OR circuits 184 and 183 respectively.

For "code" control of speed, a speed sensor 181, e.g., a tachometer, is used to feed back a signal in either analog or digital form to a speed Comparator circuit 180. This signal is compared to the commanded signal from the speed command decoding circuit 92. Accordingly, the comparator 180 puts out the proper increase or decrease signal through OR circuits 183 and 184 to activate the appropriate speed solenoid SOL 12 or SOL 13. The solenoids SOL 12 or SOL 13 control the air supply to one port or the other of air motor 69 to cause the crank and chain mechanism 65 and 63B to operate the adjustable pulley 58 of the variable drive assembly. The rotating belt 57 supplies the necessary linking of the force to operate the spring loaded drive pulley 55 attached to the AC motor 53 when spreading this pulley to load up the spring. This power is returned to the system when the crank and chain are rotated to open the adjustable pulley; which in turn, requires that the spring loaded drive pulley close down. The speed sensor or tachometer 181 is connected to the centerline of the shaft of pinion gear 17 so that regardless of the position of the gear 70, the range of speed of pinion gear shaft will be the same.

TOOL CHANGING

The operation of changing tools T on the spindle 26, whether under manual or automatic control, requires the spindle 26 be in its fully retracted position, and this is determined by the upper limit switch 121 positioned to be actuated by means of an actuator carried by the quill 21. Switch 121, in addition to other functions, interrupts the operation of the spindle rotation motor, and the quill motor, as hereinbefore described. Below the switch 121, there is disposed a deceleration switch which causes the speed of the quill motor to be reduced as the quill 21 approaches the upper limit of its movement.

TOOL EJECTION

To eject a tool from the spindle 26, it is necessary that the quill 21 and spindle 26 be retracted to their uppermost position. The uppermost position is indicated by a quill actuator closing a quill upper limit switch 121, similar to that described in U.S. Pat. No. 4,008,518. The spindle drive motor is de-energized to stop spindle rotation. If desired the spindle brakes B may be activated and maintained activated. An indication that the spindle has stopped is derived from the tachometer 181 or other suitable electrical indicator which is suitably connected in the circuit.

An operator, supporting the tool T and its tool holder 28, then places the eject switch EJ in the eject position. A circuit in series with the interlock switch 121 and the spindle stopping switch energizes the ground plate solenoid SOL 1 which activates the ground plate cylinder 162 to drive the ground plate 37 into locking engagement with the spindle portion 51. When the ground plate 37 is fully engaged with the spindle, an electrical switch C is activated. (FIG. 11 and FIG. 24). When ground plate 37 is engaged, switch C is closed and the circuit to the air control solenoid SOL 2 is activated to feed air pressure onto the primary diaphragm 152. The displacement of the primary diaphragm 152 produces a downward motion on the drawbar 140 and associated hook assembly 141 to compress the Belleville springs 149. This movement removes the holding force from the tool holder 28. Toward the end of the primary diaphragm stroke, the tool holder 28 is pushed free of the spindle taper 27, as hereinbefore described; but the tool adaptor 28 is still gripped by the drawbar finger hooks 146. At the end of the movement of the primary diaphragm 152, a switch D is actuated by an actuator 133 carried by the diaphragm plate 153. See FIG. 24. Switch D, in series with the above circuit, closes the circuit to air solenoid SOL 3 to feed air onto the secondary diaphragm 164. The displacement of the secondary diaphragm produces a motion on the push rod 36 and the associated guide assembly 166 that allows the finger hooks 146 to disengage from the tool holder; thus releasing it from the spindle 26. As soon as the secondary diaphragm 164 movement starts, it activates switch E which is the primary diaphragm hold switch. The actuation of switch E closes a circuit for holding the primary diaphragm solenoid SOL 2 energized independently of the control or eject switch EJ. From the foregoing, it will be noted that the tool adaptor 28 and tool held thereby is ejected from the spindle 26 and that the spindle is in position to receive a new tool.

TOOL RETENTION SEQUENCE

It will be understood that before a tool T can be inserted into the spindle socket 27, the spindle assembly must be in its eject position as described in the foregoing Tool Eject Sequence. Thus, the control or eject switch EJ is in the eject position. In manual operation, an operator will insert a tool holder 28 and its tool T up into the spindle socket 27 as far as it will go and firmly support the tool holder 28 within the spindle socket 27. With the tool adaptor 28 so positioned, the control switch EJ is placed in the tool retention position. When the control switch EJ is positioned in the retention position, both air solenoids SOL 2 and SOL 3 feeding air onto the primary 152 and secondary 164 diaphragm are de-energized. The solenoid SOL 1 activating the ground plate cylinder 162 is likewise de-energized; but the ground plate remains engaged since it is mechanically held by the primary diaphragm action. As the solenoid valve SOL 3 is de-energized, it will exhaust the air acting on the secondary diaphragm 164 to remove the pressure from the push rod. Upon removal of the pressure on the push rod, the spring 170 biasing the push rod will cause the finger hooks 146 to engage with the new tool holder.

When the finger hooks 146 are fully engaged with the new tool adaptor 28, the secondary diaphragm 164 has returned to its initial position, at which time, it will release switch E. The opening of switch E results in de-energizing solenoid SOL 2, which exhausts the air pressure acting on the primary diaphragm 152. The release of the air pressure on diaphragm 152 results in resetting the diaphragm 152 to its initial position, thus causing the Belleville springs 149 to reapply the spring holding force on the drawbar assembly 35 to draw the drawbar and finger hooks 146 upward to draw the tool adapter 28 tightly within the spindle socket 27. Thus, the transfer of the force of the Belleville springs from the spindle to the tool holder 28 allows the ground plate 37 to become disengaged from the spindle; the ground plate 37 being returned under the force of spring 159A acting thereon. The return of the ground plate 37 by the action of spring 159A effects the actuation of switch F. The actuation of switch F generates a signal indicating the completion of the tool retention cycle, and the actuation of switch F is a necessary, but not sufficient condition to signal the completion of the cycle to the control system. The other condition required for completing the control cycle is the sensing of the spindle orientation reset switch U actuation. While spindle orientation is not required for local or manual tool changing, it is necessary for automatic tool changing.

TOOL STORAGE AND TOOL TRANSFER

As shown in the accompanying drawings (FIGS. 15, 16, 17, 18, 19, 20, 21), the tool storage and transfer TT device of the present invention comprises a supporting frame 210 which can be mounted on the floor but, preferably is attached to the column 211 of the machine tool with which it is used, such as, for instance, a drilling or milling machine having a vertical spindle 26 (see FIGS. 1, 2, 3) mounted in the spindle housing and provided with a nose having tapered socket 27 for receiving and holding the tapered tool holder 28 of a work-performing tool T.

The main frame 210 has a post 278 (see FIG. 19) depending from it for supporting a tool holder storage means referred to herein as a tool rack 218 which, in the broader aspect of this invention, may be any suitable or well known form of storage means, but which, as shown, includes a generally circular turn table 219 mounted for rotation in a horizontal plane on suitable bearings on post 278.

The tool rack 218 has in its peripheral edge a plurality of equally spaced equispaced U-shaped slots forming sockets 221, each adapted to receive and hold the tool holder 28 of a particular working tool.

Supported by the main frame 210 there is an elongated arm 223 which extends from the tool rack 218 into close proximity with the spindle 26. The arm 223 comprises a vertical bar 224 secured to a horizontal plate 225, the latter forming tracks 226 for supporting and guiding a tool holder carriage 227 having wheels 228 engaging the top surfaces of the plate 225, wheels 229 engaging the bottom surfaces of the plate 225 and rollers 229A engaging the side edge of the plate 225 so that the tool holder carriage 227 will be suspended from the arm 223 but will be prevented from swinging or moving laterally thereon.

The arm 223 extends horizontally from the tool rack 218 toward the spindle of the machine tool at a level substantially above that of the nose of the spindle so that the arm 223 will not interfere with the operation of the machine tool. For the same reason, the delivery end of the arm 223 is spaced horizontally from the spindle and the carriage 227 has a horizontal mechanical hand 230 which extends forwardly to underlie the spindle 26 when the arm 223 and carriage 227 are in position to remove a tool holder 28 from the spindle 26 and deliver another tool holder to the spindle.

The vertical bar 224 of the arm 223 has fixed to it a bracket 224A, see FIGS. 17, 18, which is fixed on a shaft 231 pivotally mounted in bearings 231A carried by the main frame 210. Extending from one end of the bracekt 224A is a plate 232 carrying a roller 233 which rides in a groove 234 of a box cam 235 fixed on a master shaft 236 rotatably supported by the main frame 210 and driven by a reversible motor AM, as will be hereinafter described.

DESCRIPTION OF AIR MOTOR FOR CARRIAGE DRIVE

The air motor AM for driving the carriage 227 comprises a cylinder 450 having a central partition 451 which is fixed intermediate the ends of the cylinder 450. A piston rod 452 having spaced apart piston heads 453, 454 are disposed on opposite sides of the fixed barrier or partition 451 with the piston rod 452 extending through the barrier 451. Suitable seals are provided about the piston rod opening 451A in the barrier 451 so as to prevent the leakage of fluid between cylinder portions 450A and 450B, disposed to either side of the barrier 451. As seen in FIG. 17, the respective piston heads 453 and 454 divide the respective cylinder portions 450A and 450B into a pair of expandible chambers 452A, 452B and 453A, 453B respectively. As will be hereinafter described, chambers 453A and 453B comprise air chambers which are controlled by solenoid valves 15 and 16. Chambers 452A and 452B are connected to an oil reservoir 455 so as to define a closed oil circuit.

Referring to drawings (FIG. 17) the oil reservoir 455 contains a supply of hydraulic fluid. The outlet 455A of the reservoir 455 connects with a vena contracta orifice 456. The vena contracta has opposed outlets 456A and 456B connected to conduits 457 and 458 which communicate with oil chambers 452A and 452B, respectively.

Thus, it will be noted that chambers 452A and 452B of the tandem actuator 450 are filled with oil, and are connected externally to the vena contracta 456, the latter providing a flow control for the hydraulic fluid between chambers 452A and 452B as the piston heads are reciprocated, as will be hereinafter described. It will be understood that the oil in the reservoir 455 is at atmospheric pressure. The connection of the oil reservoir 455 to the smallest restriction of the vena contracta as shown in FIG. 17, essentially isolates the oil reservoir 455 from the higher pressures generated in chamber 452A and 452B when the air motor AM is actuated.

Chambers 453A and 453B are each connected to a source of a compressed air supply via two individual 3-way solenoid valves SOL. 15 and 16. When neither solenoid valves SOL 15 and SOL 16 are energized, air chamber 453A and 453B are connected to atmosphere by way of the exhaust ports of solenoid valves SOL 15 and SOL 16. Thus, no power or force is imparted on the air motor AM. When solenoid SOL 15 is actuated, air pressure is directed through conduit 459 into air chamber 453B, thus driving the piston rod and piston heads 453 and 454 to the left as viewed in FIG. 17. The piston rod 452 is thus shifted toward a protracted position. In so driving the piston rod 452, oil is forced out of chamber 452A through conduit 457 and through the vena contracta 456, and then into chamber 452B by conduit 458. Thus, the velocity of the piston rod is determined for the most part by the ability of the oil to flow through the vena contracta orifice 456; thereby minimizing the influence of load and air pressure for determining the velocity of the piston rod. When solenoid SOL 15 is de-energized and solenoid SOL 16 is actuated, the piston rod 452 is retracted into the cylinder 450 in which case, the flow of oil between chambers 452A and 452B is reversed. This is because actuation of solenoid SOL 16 causes air pressure to be directed to chamber 453A through conduit 460 as chamber 453B is exhausted to atmosphere via the exhaust port in solenoid SOL 15. The reciprocation of the piston rod 452 as herein described is utilized to drive the carriage 227 of the tool changer through a tool removal and insertion operation.

The reciprocation of the piston rod 452 of the air motor AM is transmitted to the carriage 227 by means of a rack 461 (FIGS. 17 and 18) connected to the free end of piston rod 452. The rack 461 in turn is in meshing engagement with a rack pinion 462 which is journalled to a shaft 236 to which a drive or box cam 235 is connected. The drive or box cam 235 has a cam groove 234 which received a cam follower or roller 233. The cam follower 233 is journalled to a plate 232 extending from one end of a bracket 224A which is fixed to the vertical bar 224 of the arm 223. The arrangement is such that when roller 233 is riding in the concentric portion 234A of the cam groove 234, the arm 223 is held substantially horizontal. However, when the inwardly sloping portion 238 of the cam groove 234 and the outwardly sloping portion 239 engage roller 233 on plate 232; the arm 223 and the tool transport carriage 227 thereon will pivot about the horizontal shaft 231 causing the distant or remote end 223A to swing downwardly and then upwardly to insert a tool holder 28 into socket 27 of spindle 26 of the machine tool. (See FIG. 15).

The linear or transverse movement of the carriage 227 along arm 223 from its position of rest over the tool rack 218 to the spindle 26 and back to the rack 218 is effected by an endless drive means 241. The endless drive comprises a sprocket wheel 242 over which an endless drive chain 241A is threaded. The upper flight of the driving chain 241A is threaded under an idler sprocket 243 which is rotatably mounted on the bar 224 of arm 223. The chain 241A is then threaded about an end sprocket 244 which is rotatably mounted on the end 223A of the arm 223. The lower flight of the chain 241A threaded about end sprocket 244 is connected to the carriage 227 at a point 245 and thence about the other end sprocket 242, which is rotatably journalled about a shaft 246 carried in a bracket 224A which is carried by the vertical bar 224 of arm 223.

To drive the sprocket wheel 242 in opposite direction so as to advance and retract the carriage 227 in a reciprocating motion between the tool rack 218 and the spindle 26 without using shiftable gears, and for accelerating and decelerating the speed of the carriage 227 as it leaves and approaches its respective terminal position along arm 223; the sprocket wheel 242 is connected to a gear 248 which is positioned to be engaged by a gear rack 249, one end of which is pivotally connected by a rod end bearing 249A to a crank arm 250, which is fixedly connected to the box cam 235. The box cam in turn is driven by the air motor AM as hereinbefore described. The gear rack 249 is positively held in engagement with gear 248 by a retainer 251 which is pivotally mounted on shaft 246. Connected to the retainer 251 are a pair of spaced apart rollers 252 disposed in rolling engagement with the flat back surface 249B of the gear rack 249.

Referring to FIGS. 21 and 23, the carriage 227 has a depending portion or arm 254 to which a tool holder grasping mechanical hand 230 extends horizontally therefrom. The forward end of the mechanical hand 230 has a U-shaped socket 256, the edge portion 257 of which is spaced so as to be received in an annual groove 258 defined by spaced flanges 259 and 260 of the tool holder 28 (FIG. 15). The edges 257 of the mechanical hand 230 have inclined or tapered ends 257A and inclined tips as at 257B so as to guide the hand 230 onto the tool holder 28 during a tool changing operation as will be described.

On the underside of the mechanical hand 230, as best seen in FIGS. 21 and 23, there are mounted fingers 261 which are pivoted intermediate their ends at 262. One end 261A of the fingers are inwardly turned or hooked shaped to extend into and out of the U-shaped socket 256 defined in the end of the hand 230. The other end 261b of the respective fingers 261 is pivotally connected to one end of a connecting link 263 at 263a. As best seen in FIG. 23, link 263 is generally L-shaped and is pivotally connected at 263b to a common link 264; which is adapted to be moveably mounted to effect the displacement of the inner ends 261A toward and away from each other. The actuation of the common link 264 is effected by a bellcrank 265. As best seen in FIG. 21, the bellcrank 265 is pivoted at 265A to the hand 230 and pivotally connected to the common link 264 so as to bias the fingers 261 so that the hook shaped ends 261A are normally urged toward each other. This is attained by connecting one end of springs 266 to a pin 266A fixed to hand 230 and having the other end of springs 266 looped to a projection 266B on link 264. It will be noted that when the fingers 261 are extended into the annular groove 258 of a tool holder 28, the hook shaped ends 261A of fingers 261 engage the groove 258 at points beyond its diameter and releaseably maintain the tool holder 28 in the hand's socket 256.

The bellcrank 265 is actuated by a push rod 268 which is vertically slideable, in suitable bearings located in the arm 254 of the carriage 227. The arrangement is such that when the carriage 227 has moved toward its terminal position, the push rod 268 is caused to be depressed thereby causing the fingers 261 to be moved to a tool holder releasing position.

TOOL TRANSFER OPERATION

Assuming that work with the tool T in the spindle 26 has been completed, and that the spindle 26 is fully retracted and that, if necessary, the workpiece and worktable have been moved out of the way; the air motor AM is actuated to protract the rack 461 which in turn rotates shaft 236 and the box cam 235 clockwise. As the crank arm 250 rotates clockwise from the position shown in FIG. 15; the gear rack 249 will be pulled downwardly and toward the left causing the gear 248 to rotate the sprocket wheel 242 counterclockwise and advance the carriage, first slowly, during the first 45° of movement of the crank arm 250 as the pivot pin 249A moves from approximately a dead-center position. As the crank arm 250 continues to rotate for approximately the next 90° the speed of the carriage 227 is gradually accelerated and then is decelerated during the next approximately 45° until the crank arm 250 reaches a position in which the empty mechanical hand 230 on the carriage 227 reaches the spindle along a raised or horizontal plane. As this occurs, the push rod 268 on the carriage 227 engages a cam surface 269 (FIG. 15) on abutment 270 and is depressed to reverse the toggle links 263 on the mechanical hand 230 and allowing the hook-like ends 261A of the fingers 261 and the edge portions 257 to move into the groove 258 of the toolholder 28.

When the empty hand reaches the spindle, a switch G, operated by an actuator 461A on the air motor rack 461, is closed to activate a tool holder ejecting means, as herein described, to release the tool holder 28 from the spindle drawbar finger 146 and deposit the tool holder 28 on the mechanical hand 230.

As the box cam 235 and crank arm 250 continues rotating, the inwardly inclined portion 238 (FIG. 15) of the cam 235 causes the adjacent end 223B of the arm 223 to rise and the other remote end 223A of the arm 223 to be lowered to withdraw and release the tool holder 28 from the spindle socket 27. As this is taking place, the push rod 268 is caused to be raised to reverse the position of the hand links 263 allowing the springs 266 to cause the hand fingers 261 to firmly grip the tool holder 28.

As the box cam 235 continues to rotate, the outwardly sloping portion 239 of the box cam causes the end 223A of the arm to rise to assume the normal horizontal position shown in FIG. 15 (solid lines) for returning the carriage 227 toward the tool rack 218.

As the master shaft 236 of the crank arm 250 continues its rotation, the acceleration and deceleration of the carriage upon return will be approximate the same speeds as occurred in travelling toward the spindle, but as the pivot 249A having passed over the dead-center line, the direction of movement of the gear rack 249 will be toward the right, as shown in FIG. 15, reversing the direction of rotation of the gear 248 and the sprocket wheel 242 to return the carriage 227 with the used tool holder 28 to the tool rack 218. With the arrangement described, the carriage is reciprocated without any gear shifting operation.

Thus, a substantial savings in the cost of manufacturing the device is obtained and the speed of travel of the carriage may be accelerated or decelerated so as to prohibit damaging the parts when the carriage reaches its terminal position shown in FIG. 15.

When the carriage 227 with the used tool holder therein reaches the tool rack 218, push rod 268 on the carriage 227 engages a cam 273 on the arm 223 and is depressed thus causing the position of the hand toggle links 263 to be reversed and the fingers 261 on the hand 230 to release the tool holder.

However, before this happens the edges 221A of the socket 221 on the tool rack 218 will have entered the space 258A under the flange 260 of the tool holder, shown in FIG. 15. The arm 223 is then lowered slightly by the cam follower 233 engaging projection 272 on the box cam 235. This lowers hand 230 slightly allowing tool holder 28 to come to stop with flange 260 supporting the tool holder on tool rack 218.

After this has been done the carriage 227 moves toward the center of the rack 218 to a position in which it is clear of the circular row of tool holders therein and the actuator 461A on rack 461 opens the switch J to stop the motor AM.

When the carriage 227 reaches its terminal position over to tool rack, switch K energizes to operate the tool rack actuator to operate and index the rack 218 to bring the next tool to be used in front of the hand 230 on the carriage, as explained below. After the tool rack 218 has been indexed as hereinafter described, the arm and carriage driving motor AM is caused to be actuated to retract the piston rod of the air motor AM to advance the next tool to the spindle. This reverses the direction of the gear rack 249 and pinion 248 and causes the carriage to move toward the spindle with the new tool in the mechanical hand 230.

As the carriage 227 starts its move toward the spindle 26, the socket edges 257 of tool hand socket 256 enter the upper groove 258 of the tool holder 28. As box cam 235 rotates counterclockwise, cam follower 233 leaves projection 272 causing the hand 230 to lift the tool holder 28 from the surface of the rack as it is moved out of the rack socket 221. Thus the tool holder is lifted free as it leaves the tool rack 218. At the same time the push rod 268 on the tool carriage 227 rides off the cam 273 allowing links 263 to reverse their position and cause fingers 261 to engage and grasp the new tool holder 28 in the hand 230.

The continued rotation of the box cam 235 and reverse or counterclockwise movement of the rack bar 249 causes the carriage with the tool holder to travel along the track until, as the carriage approaches the spindle, the offset cam portion 239 of box cam 235 engaging the roller 233 on the adjusting plate 232 to cause the end 223A of the arm 223 to swing downwardly, as shown in FIG. 15 in dot-dash lines. In this position, the upper end of the tool holder 28 is clear of the nose of the spindle 26 and passes under it. Then, when the offset portion 238 of the box cam 235 engages the roller 233, the end 223A of the arm 223 and the carriage 227 with the hand 230 swings upwardly inserting the tool holder 28 into the spindle socket 27, as shown in dotted line position on FIG. 15.

When arm 223 raises to insert tool holder 28 in spindle socket 27, push rod 268 comes in contact with abutment 270 causing fingers 261 to release their grip on tool holder 28. Note that the tool holder is still supported by hand socket edges 257A. At the same time, switch G is activated causing the fingers 145 on the drawbar 140 to close onto tool holder 28 thereby preventing the tool holder 28 from leaving the socket 27 as hand 230 withdraws.

As the tool holder is thus received in the spindle, the cam roller 233 on the arm 223 riding along the concentric portion of groove 234 causes the arm 223 and carriage to remain in its raised horizontal position while the crank arm 250 moves the rack bar 249 to the right reversing the direction of rotation of the gear 248, sprocket wheel 242 and the direction of travel of the carriage to withdraw the end portions 257 of the hand 230 from the tool holder and bring the empty carriage back toward the center of rack 218 to a position clear of the tool holders thereon, at which time rotation of the box cam 235 and crank arm 250 is stopped by de-energizing the air motor AM.

In inserting a tool holder in or withdrawing it from the spindle taper it is important that it not rub against the spindle taper beyond that amount needed to seat or unseat it. This requires that the path of motion of the end of hand 230 be accurately controlled in the proper path as it moves between its lower position and its upper position as shown in FIG. 15. The carriage 227 is positioned by chain 241 wrapped around sprocket 242. Thus, if sprocket 242 remains essentially fixed while arm end 223a moves vertically, the carriage 227 describes an involute path. When the carriage is extended in a raised horizontal position, as shown in FIG. 15, crank arm 250 and gear rack 249 are in a dead-center condition so that carriage velocity along track 223 is zero. Continued motion of crank arm 250 in a counterclockwise direction then begins to impart a clockwise rotation to gear 248 and sprocket 242 which moves carriage 227 away from the spindle as cam 235 lower hand 230 to withdraw the tool holder 28 from the spindle taper. This motion combined with the involute path of carriage 227 described above would cause interference between tool holder 28 and the spindle taper as the tool holder is inserted or removed were it not for a compensating motion imparted by the design of the mechanism as described hereafter. The center or rotation of gear 248 and sprocket 242 is offset from the pivot 231 on which arm 223 rotates under the influence of portions 238 and 239 of the track in cam 235. (See FIG. 15 & 16). As may be seen in FIG. 15, when arm end 223A is lowered pivoting about shaft 231, the center of gear 248 is moved essentially parallel to gear rack 249 in a direction away from rack pivot 249A. This imparts a counterclockwise rotation to gear 248 and sprocket 242 extending carriage 227 toward the spindle center line in an amount proportional to the angular movement of arm 223. This motion is superimposed on those described above to give tool holder 28 a path of motion such that it enters into or is withdrawn from the spindle taper without interference or excessive rubbing action.

As soon as the carriage is clear of the spindle, the programming apparatus, as explained below, causes the mechanism of the machine tool to rotate the spindle 26 and the tool therein at a determinate speed and causes the quill mechanism to function to advance the tool to the workpiece.

It should be noted that the sequence of the operations of extracting the used tool holder from the spindle and returning it to position of rest over the tool rack 218 is the reverse of that occurring when taking the tool holder from the tool rack to the spindle. Each of these operations is accomplished by operation of the motor AM without the use of reverse gears, by the crank arm 250 passing over the dead-center line and reversing the direction of rotation of the sprocket wheel 242 and the direction of travel of the sprocket chain 241 accordingly.

Referring to FIG. 25, it will be noted that a chain guard actuating cam 515 is journalled to shaft 236. Operatively connected to the cam 515 is a cam follower 516 which is suitably connected to a link which is connected at its other end to a chain guard which covers the driving chain 241. The arrangement is such that the chain guard (not shown) will open to permit the hand 230 to traverse along the arm during a tool change operation as herein described. As shown in FIG. 25, the cam 515 is provided with a notch 515A which permits the cam follower 516 to traverse a distance greater than 360° about the cam.

TOOL ORIENTING

In order to orient the rotative position of the tool in the tapered socket 27 of the spindle and to provide a positive drive between the spindle 26 and the tool holder 28, the nose of the spindle has a slot 26B (FIG. 12) in which a downwardly extending lug 26C is located and the tool holder 28 has a flange 259 provided with a radial slot 259A which slideably receives the lug 26C and forms a positive driving connection between the spindle 26 and the tool holder 28. When the tool holder is to be used in a tool changing machine, flange 259 has a diametrically opposed slot 259B, and flange 260 has a radial slot 260A. Slot 259B is entered by a lug 230B on the tool carrying hand 230 to maintain the tool holder 28 properly oriented in travelling to and from the spindle 26. Each socket 221 of the tool rack 218, as shown in FIG. 18, has a lug 226a which engages the slot 260A in the flange 260 which maintains orientation of the tool holder while being stored in the rack. The slot 259B in the flange 259 of the tool holder is narrower than the slot 259A so that slot 259B will not receive the lug 26C on the spindle, thus maintaining a 360° orientation of the tool holder 28 relative to the spindle positive.

Upper groove 258 is not as deep as lower groove 258A on the tool holder so that it will not allow its inadvertent engagement between the tool holder 28 and the tool rack socket 221.

If the orientation of the tool is to be maintained, the spindle must be stopped, before any tool changing operation can be performed, at precisely the same oriented position each time it stops to eject a tool and receive another tool.

TOOL RACK INDEXING

The indexing of the tool rack 218 in accordance with this invention is accomplished by a step-by-step intermittent movement wherein the tool rack 218 is rotated in one direction only. A turntable 219 supporting the tool rack 218 is rotatably mounted on bearings 220 which are supported on post 278 depending from main frame 210.

The turntable 219 has a plurality of equally spaced peripheral slots or notches 279, one such notch 279 for each notch 221 on the tool rack 218. For example, if the tool rack 218 has twenty-four notches 221; the turntable 219 has twenty-four corresponding notches 279. Accordingly, the positioning of the tool rack 218 as will be hereinafter described may be either in one step or multiple steps, the rotation being always unidirectional.

The indexing mechanism for the tool rack 218 and associated table 219 comprises an air cylinder 500 that is air powered in one direction and spring powered by a spring 501 to return the piston of the air cylinder 500 to its initial inoperative position. One end of spring 501 is fixed to the machine frame and the other end of spring 501 is connected to a driving chain 502 which is threaded about a sprocket 503 which is integrally connected to a rotatably mounted ratchet 504. The sprocket 503 and ratchet 504 is journalled about a vertically disposed shaft 506. Cooperatively associated with the ratchet 504 is a pawl 507 which is pivoted to a transmission plate 508 which is keyed to the indexing shaft 506. The indexing shaft 506 is keyed to plate 508 by providing the end of shaft 506 with flats 506A which end is received in a complementary opening formed in plate 508. A spring 509 connected to plate 508 functions to impose a bias on plate 508. Accordingly, the arrangement is such that the ratchet and pawl function as a unidirectional, step-by-step drive for the turntable 219 and rack 218 each time the cylinder 500 is actuated.

Connected to the upper end of the indexing shaft 506 is a head 510 carrying two projecting pins 511 which are diametrically opposed and about which a roller 512 is rotatably journalled.

The shaft 506, and the rollers 512 carried on head 510 are so positioned relative to slots 279 of the turntable 219 so that when the rollers 512 are located in adjacent slots 279 in a position of rest, as shown in FIG. 18, the axes of the rollers 512 lie on the arc of rotation of the table 219. Thus, in the rest position, the turntable 219 is locked against rotation.

When, shaft 506 is rotated through an angle of 180°, one of the rollers 512 will advance further into its associated notch 279 thereby causing the turntable 219 and rack 218 to rotate one step. The other roller 512 at the same time is moving out of its associated notch 279 and finally moving slightly into the next adjacent notch 279; before the driving roller 512 leaves its slot. When the two rollers are again disposed so that their axes line on the arc of rotation of the table 219, the turntable is again in a locked position. To advance the turntable another step, the cycle is repeated.

The position of the tool rack 218 is electrically encoded by switch closures in a manner similar to that described in U.S. Pat. No. 4,008,518. For positioning a selected tool holder 28 which is to be transferred to the spindle 26, there are provided a plurality of cams 293 which are supported on the hub 278 of the turntable 219, and which cams 293 are operatively associated with corresponding switches 293A. The switches 293A are connected in binary coded decimal circuits controlled by a programming apparatus; which operates to energize the air cylinder 500 so as to advance a predetermined tool rack socket 221 and tool therein in front of the tool holder carriage.

There are two electrical switches associated with the driving or indexing of the tool rack 218. One of these electrical switches is the rack-in-position switch I which is actuated by a rack detent lever 218A (See FIG. 25). The other switch T senses that the rack drive cylinder 500 has been fully reset by the return spring 501. (See FIG. 25). The electrical sequence for the indexing of the tool rack 218 starts by energizing the tool rack drive solenoid SOL 14 which directs air pressure to the drive cylinder 500. Actuation of the drive cylinder 500 starts the rack 218 turning. In doing so the rack fully reset switch T and the rack-in-position switch I are released. As the drive cylinder 500 is activated, the piston rod 500A is displaced; i.e., retracted into the cylinder as seen in FIG. 20A and FIG. 25, causing the rack 218 to rotate until the rack-in-position switch I has been reactivated to indicate that the cylinder stroke has been completed, and that the drive rack cylinder 500 can be reset. When the piston rod 500A is retracted, it will pull the chain 502 threaded about sprocket 503 against the force of the spring 501. In doing so, the ratchet tooth 504A causes the ratchet to drive the pawl 507 in a clockwise rotation as seen in FIG. 20A. Displacement of the pawl 507 clockwise will effect the drive of the transmission plate 508 and the indexing shaft 506 keyed thereto thereby effecting the rotation of head 510. This is attained by energizing the drive solenoid SOL 14. When solenoid SOL 14 is de-energized, the cylinder 500 is reset under the action of spring 501 whereupon the reset switch T is activated. If the position of rack 218, as indicated by the rack binary switches 293, is not equal to the commanded tool number, the cycle is repeated with the re-energization of the rack drive solenoid SOL 14. Thus, the cycle is repeated until the desired tool has been brought in position, as indicated by the rack position binary switches 293.

From the foregoing, it will be noted that the rack-in-position switch I is useful as an interlock and sequencing switch to indicate that the rack cycle has been completed once the switch has been released and then reactivated to act as a position "strobing" switch for reading the rack-in-position binary switches 293 and to serve as an interlock to prevent tool arm motion if the tool rack 218 is not in proper position.

It will be understood that a "local" switch can be provided to index the rack 218 for set up. The operation of such a rack indexing local switch is to rotate the rack continuously so long as the switch is activated. When the switch is deactivated, the indexing operation in progress is completed.

AUTOMATIC TOOL CHANGING SEQUENCE

Referring to FIGS. 25, 26, and 27, the automatic tool changing sequence is as follows: Before the circuits for effecting an automatic tool change are activated, the local control and set up switches 301, 302 must both be in an "off" position. The signal for a tool change may be initiated by a suitable tape command or by a manual input of a tool number code by the actuation of the tape reader input unit 94 or the manual coding unit 93. The tool number signal thus generated is directed to a tool position comparator circuit 303 via a tool command decoding unit 303A and by lead 303B where the tool number signal is compared with signals received from the tool rack binary cam switches 293 over lead 294 and terminal CC. The signal received from the tool rack 218 indicates the position of the tool rack, which corresponds to the number of the tool T that is in the spindle at the time. The circuitry is such that it will assume this fact whether or not there is a tool T in the spindle. As the two signals will not be equal, the comparator circuit 303 will so indicate by putting out an inequal signal. This unequal signal is then fed to an AND circuit 304 over lead L23. Also fed to AND circuit 304 over leads L24 and L25 are the signals that confirm that the set up switch 302 and local switch 301 are each "off."

The output of AND circuit 304 is routed to several AND circuits, viz., AND circuit 305, AND circuit 316, and AND circuit 320; one OR circuit 330 and one inverter circuit 329. At AND circuit 305, the output signal of AND circuit 304 is added to the signal from the controller 306 indicating that all machining operations have been completed. The output of the AND circuit 305 initiates a command signal to fully retract the quill 21 by actuating the quill stepping motor 34. The command signal initiated at the output of AND circuit 305 also executes the X-Y positioning move of the machine table 17.

When the quill has been fully retracted by the actuation of the quill stepping motor 34, the quill 21 actuates a quill-at-top switch 121. The actuation of the quill top switch 121 triggers AND circuit 316 to stop the main drive motor by first electrically de-energizing the main drive motor 53 and then applying the spindle brake. The circuit actuating the spindle brake is from the output of AND circuit 316 via leads L316 through the OR circuit 313, the inverter circuit 327 and the AND circuit 315; the output of AND circuit 315 energizing the brake solenoid SOL 17 which in turn actuates the brake cylinder to effect the braking of the spindle 26.

When the spindle speed has been reduced to "zero," as is indicated by the output of the motor speed sensing circuit 98, the signal is delivered to the ground plate solenoid SOL 1 by way of an AND circuit 318 and OR circuit 319. At the same time, a signal is directed to the gear shifter circuit to shift the spindle to a "neutral" position. This signal is at terminal X-X of both circuit of FIGS. 26 and 27. When the shift to neutral is completed, as hereinbefore described, the signal so indicating is at terminal WW to trigger AND circuit 399 (FIG. 27) which energizes the spindle orientation solenoid SOL 11 by way of terminal YY (FIG. 27) and OR circuit 192 (FIG. 26). Upon actuation of the orientation solenoid SOL 11, the spindle is oriented as hereinbefore described. However, in an automatic tool changing operation, the mechanism does not go back and forth as in the case of jogging. Instead, the orientation cylinder 400 is powered to extend its rod and rack 401 fully and keep it extended during the tool changing operation.

The completion of the orientation cycle is signaled by the actuation of the spindle orientation-complete switch S by the operator 414; associated with rack 401A of the orientation cylinder 400. The actuation of switch S triggers the primary diaphragm solenoid SOL 2 by way of AND circuit 320, OR circuit 323, and AND circuit 322 only after the ground plate has activated switch C. (FIG. 27).

At the same time, a signal from the output of AND circuit 320 over lead 320a is directed to OR circuit 396 and AND circuit 321 where it is added to the fact (a) that the tool rack detent switch I is actuated; (b) that the reverse arm drive solenoid SOL 16 is not energized; and (c) that the X-Y table movement has been completed. When all of these conditions have been satisfied, AND circuit 321 is triggered to energize the forward arm drive solenoid SOL 15 to extend the piston rod 452 and associated rack 461, which is coupled to the cam 235 for effecting the drive of the carriage 227 as hereinbefore described. The movement of the carriage 227 thus drives the hand 230 toward the spindle 26. As hereinbefore described, the oil circuit of the tanden air motor cylinder 450 is the only means of controlling the velocity of movement of the hand drive mechanism 230. This velocity is mainly controlled by the ability of the air portion of the tanden cylinder 450 to create sufficient force to displace oil from one oil chamber to the other through the vena contracta orifice 456.

When the hand 230 is engaged with the tool holder 28 in the spindle 26, a switch cam 461A attached to the air motor drive rack 461 actuates a switch G. Switch G when actuated, triggers the secondary diaphragm solenoid SOL 3 through OR circuit 325 and AND circuit 326. When the secondary diaphragm is actuated, the fingers are actuated to release and push the tool holder free of the spindle 26 and into the control of the hand 230. As the hand 230 reaches the spindle 26, a fixed cam surface in the vicinity of the spindle is so positioned to activate the hand fingers 261 to grip the tool holder 28 as hereinbefore described. Subsequent motion of the piston rod 452 and arm drive rack 461 and drive of the box cam 235 causes the arm with the hand 230 and tool holder 28 to lower the tool out of the spindle taper 27 and to return the tool holder 28 with tool to the tool rack 218.

As the arm or carriage 227 reaches a predetermined point at the rack 218, a second fixed cam is engaged by the hand 230 to cause the hand fingers 261 to open so that the tool holder 28 is deposited into the appropriate notch 221 of the tool rack 218 as the carriage 227 continues back. When the arm or carriage 227 is fully back toward the rack 218, as when the piston rod 452 of the air motor 450 is fully extended, switch K is actuated by the rack cam 461A. (See FIG. 25).

Actuation of switch K sends a signal by lead L-41 to AND circuit 317 which is added to a signal from AND circuit 304, and which results in the tool rack drive solenoid SOL 14 being energized. Actuation of the tool rack drive solenoid SOL 14 supplies air to the tool rack air cylinder 500 causing it to retract its piston rod 500A. Connected to the end of the piston rod 500A is a drive chain 502 that engages with a drive sprocket 503, and which drive chain 502 is reset by a return spring 501. Connected to the sprocket 503 is a ratchet 504. The ratchet 504 is rotated as the cylinder 500 drives chain 502 and associated sprocket 503. As the ratchet 504 rotates, one of its opposed notched surfaces 504A, which are disposed 180° apart, is disposed to drive pawl 507. The pawl 507 in turn is pivoted on a plate 508 that is keyed to a Geneva drive shaft 506. The pawl 507 is spring loaded by spring 509. Thus when cylinder 500 is actuated, it drives the plate 508 whereby the Geneva movement 510 will index the tool rack 218 as described.

In operation, as the tool rack drive cylinder 500 is activated to retract its piston rod 500a; the ratchet 504 is rotated. After a slight rotation; e.g., approximately 10° of travel, one of the notched portions 504A of the ratchet 504 engages the pawl 507. As the piston 500A retracts further, the rotation of the ratchet 504 is transmitted to plate 508 to the Geneva drive shaft 506 to the tool rack 218 to rotate it one tool position. During this movement, the rack reset switch T is released as the switch T actuator 500B which is attached to the piston rod 500A. Also, as soon as the Geneva 510 starts to rotate, the tool rack detent switch I is released; switch I being again reactivated when the tool rack 218 has rotated one position. This action all occurs before the tool rack drive cylinder 500 has fully completed its stroke. The reactivation of switch I initiates the signal that de-energizes the solenoid SOL 14 which causes the tool rack drive cylinder 500 to be reset by the return spring 501. During the return stroke of the piston rod 500A, the ratchet 504 is returned, causing the curved portion of the ratchet to slide under the pawl whereby the opposite notch 504A engages the pawl as plate 508 has been displaced approximately 180° to a position seen in FIG. 20A whereby the next tool rack index cycle can be made. Until the next tool rack cycle occurs, the pawl 507 is prevented from moving by a detent action of the Geneva drive mechanism.

When AND circuit 317 is triggered by the actuation of switch K, a signal is sent through OR circuit 324, AND circuit 394, OR circuit 393 and AND circuit 392 to energize solenoid SOL 14, hereinbefore described. A holding circuit is provided in the OR circuit 393 so that the output of OR circuit 393 is still triggered even though switch T opens as the tool rack drive cylinder 500 begins to move. When the tool rack detent switch I is released, it triggers AND circuit 389, which also has a holding circuit making this circuit subsequently independent of the switch I. Thus when the tool rack positioning cycle is completed, the fact is sensed by the reactuation of switch I. This then triggers AND circuit 390 as there is at this time an output from AND circuit 389. Because of the inverter circuit 391, AND circuit 392 is turned off to thereby de-energize solenoid SOL 14. Remembering that at this time, switch T is open, the "off" signal at the output of AND circuit 392 will also turn "off" the OR circuit 393 and the two AND circuits 389, 390. As the tool rack drive cylinder is fully reset by the action of the return spring 501, it will reactuate switch T.

If a new tool position, as indicated by the binary cam switches 293 via lead 294 does not match the commanded tool number, as hereinbefore described, the comparator circuit 303 will issue an unequal output signal keeping AND circuit 317 and OR circuit 324 still active. Hence, with the reclosing of switch T, AND circuit 394 will re-trigger; and OR circuit 393 re-energized to restart the tool rack indexing cycle as hereinbefore described; with the result being the tool rack drive cylinder 500 is put through another cycle to advance the tool rack one more position. The arrangement is such that the step by step tool rack position or cycle continues until the binary cam switches 293 indicate that the commanded tool number position has been reached, which will be signaled by the fact that the comparator circuit 303 no longer has an output. When this condition is satisfied, the absence of a signal from the comparator circuit 303 along line L-41 will trigger inverter circuit 329 to energize the reverse arm drive solenoid SOL 16 by way of OR circuit 330 and AND circuit 328. Throughout the entire tool rack positioning cycle, air pressure was continuously directed by solenoid SOL 15 to the air motor 450 so as to maintain its piston rod 452 fully extended. This condition was attained by OR circuit 398 which enables the energization of AND circuit 321 independent of the position of the detent switch I once solenoid SOL 15 has been energized. But when solenoid SOL 16 is energized, the inverter circuit 397 will turn "off" solenoid SOL 15. Thus air is therefore directed to retract the piston rod 452 of the tanden air motor 450. The retraction of piston rod 452 of the air motor results in the movement of the hand 230 toward the spindle 26 by the hand drive mechanism consisting of the rack 461, gear 462 and associated box cam 235 and driving rack 249. The hand 230 with its fingers 261 opened by a cam 273 as it approaches the new tool holder 28 will effect the tool holder's disengagement from the rack 218; the fingers closing onto the tool holder as the hand continues toward the spindle 26. The arm motion is such that the hand 230 is lowered to pass the tool holder 28 below the spindle 26 and then to raise the tool holder up into the spindle taper 27 to seat the tool holder therein. At the top of this motion, switch G will be released by the switch cam that was holding it actuated. The release of switch G turns "off" OR circuit 325 and AND circuit 326, thereby de-energizing the secondary diaphragm solenoid SOL 3. When this occurs the push rod 36 and associated guide assembly, under the influence of the spring 170 causes the fingers 145 to close onto the tool holder 28. Simultaneously, the fixed cam 269 on the quill housing 15 adjacent the end of arm 223 in the spindle area will cam the hand fingers 261 open so that the hand 230 can be withdrawn from the tool holder 28, which is now captured by the spindle fingers 145 for return back to the tool rack 218.

When the push rod 36 is fully retracted, it opens switch E, which was energizing a holding circuit to the primary diaphragm solenoid 2. Thus solenoid SOL 2 is de-energized together with the ground plate solenoid SOL 1 when switch E is operated to turn "off" OR circuit 323 and AND circuit 322. When this occurs, the force of the Belleville springs 149 is reapplied to the drawbar to retain the tool holder 28 snugly in the taper socket 27 of spindle 26, and also allows the ground plate 37 to retract out of engagement with the spindle extension 51.

It is to be further noted that when the tool rack 218 positioning cycle has been completed to the new tool position, as evidenced by the absence of a signal from the comparator circuit 303, the orientation solenoid SOL 11 is de-energized. This operation of solenoid SOL 11 will direct air to the associated orientation cylinder 400 (FIG. 26) so as to retract pawls 405 and 406 out of engagement with the spindle cup 412. The complete disengagement of pawls 405 and 406 from the spindle cup 412 is sensed by the orientation reset switch U. Also, when the ground plate 37 has completely disengaged from the spindle, it will actuate switch F; and the tanden air cylinder 450 upon completion of its retraction will actuate switch J. The actuation of these three switches, U., F., and J direct their respective signals which are summed up in AND circuit 372 to generate a signal to the controller that the tool change cycle has been completed. Also, when switch J is actuated, the solenoid SOL 16 is de-energized as the result of the turning "off" of AND circuit 328. Thus upon the completion of the tool change cycle, all associated solenoids are de-energized.

AUXILLIARY CONTROLS

Included in the circuit (FIG. 27) are two auxilliary switches or controls. The auxilliary controls include a switch UR to manually index the tool rack 218 independetly of the tool change operation, hereinbefore described and a switch V to reset the arm should it get mispositioned due to any interruption of the tool change cycle. In both situations, the switches UR and V are not functional until the local control switch 301 has been turned "on."

Acutation of the tool rack index switch UR will result in the indexing of the rack 218 continuously until the switch UR is deactivated. The circuit requires that the arm mechanism be fully extended or retracted so as to be sensed by the actuation of either switch K or J at OR circuit 312. The subsequent output of OR circuit 312 is added to the signal at AND circuit 395, the output of which goes to OR circuit 324 and to AND circuit 394. Accordingly, the rack cycling proceeds in a manner as hereinbefore described with the triggering of OR circuit 393, AND circuit 392 and solenoid SOL 14. The cycling of the tool rack drive cylinder 500 continues back and forth to index the rack 218 one position at a time with each reciprocating stroke of the drive cylinder 400, as hereinbefore described, until the index switch UR is manually released. Once the indexing cycle is triggered, it will go to completion because of the nature of switch I and its associated circuits AND circuit 389, 390 and inverter circuit 391 as hereinbefore described.

The actuation of the arm reset switch V will result in the energization of the arm reverse drive solenoid SOL 16 which will direct air pressure to the tanden air motor cylinder 450 so as to restore the hand 230 back at its tool rack position corresponding to the completion of the tool change cycle, i.e., the cylinder 500 in a fully retracted position. This is effected through OR Circuit 330 and to AND circuit 328, the output of which energizes solenoid SOL 16. When the arm has been fully reset, switch J is actuated by the rack cam 461A to thereby de-energize AND circuit 328 and solenoid SOL 16.

MANUAL CONTROL

The apparatus described can be manually controlled. The changing of tools in the spindle 26 manually is achieved by placing the local control switch 301 "on." The quill 21 must be fully retracted by the operator so that the quill-at-top switch 121 is actuated. With spindle drive motor off and the spindle stopped, the spindle is ready for tool ejection. The tool in the spindle is held by the operator as the tool eject switch EJ is placed in the eject position. This results in sending a signal via lead L-50 to AND Circuit 370 via lead 370A, the output of AND circuit 370 being directed to OR circuit 319 to effect the energizing of the ground plate solenoid SOL 1, as the AND circuit 370 was enabled by lead L-51 of a signal from the motor speed sensing circuit and L-52 of a signal from the quill-at-top circuit. When the ground plate 37 is fully engaged it will close switch C. The closing of switch C sends a signal through lead L-54 to AND circuit 322 to energize the primary diaphragm solenoid SOL 2. When the primary diaphragm is fully extended, the bias of the Belleville spring 149 on the drawbar is released. Also switch D is actuated which enables AND circuit 371. The output of the AND circuit 371 is directed through OR circuit 325 and AND circuit 326 which was enabled by a signal from lead L-52 to energize the secondary diaphragm solenoid SOL 3. When this occurs, the push rod 36 is displaced to allow the drawbar fingers 145 to spring open and thereby effect the release of the tool holder 28 from the drawbar fingers, permitting the tool to be ejected into the operator's hand.

To retain or be in a position ready to receive a new tool, the mechanism of the illustrated embodiment must be in the "eject" position hereinabove described. The new tool is then manually inserted into the spindle, and the tool switch EJ is placed in the "retain" position. This will cause the secondary diaphragm solenoid SOL 3 to be de-energized. This causes the retraction of the push rod 36 to result in the drawbar fingers 145 closing onto the tool holder. At the end of the retraction stroke of the push rod (which is under the control of solenoid SOL 3) the holding switch E is released to de-energize both the primary diaphragm solenoid SOL 2 and the ground plate solenoid SOL 1. Thus the tool is retained and the ground plate retracted from engagement with the spindle 26. The release of the ground plate will activate the tool change complete switch E, thereby signalling to the controller circuit that the apparatus is ready to proceed with the machining operation.

While we have shown herein a mechanical variable speed drive for the spindle, it should be understood that, in the broader aspects of this invention the motor 53 may be a variable speed alternating current motor.

While the operation of the box cam 235 in advancing and returning the tool carriage to and from the spindle is similar to that shown and described in U.S. Pat. No. 4,008,518, in which the movement of the box cam is controlled by a rack and pinion and stop pins control the terminal position of the box cam, according to the present invention the stop pins are omitted and the box cam is stopped by limiting the strokes of the piston rod 452.

While the invention has been described with respect to a specific embodiment, it will be understood and appreciated that variations and modifications may be made without departing from the scope or spirit of the invention.

We claim:

1. A machine tool comprising a vertical spindle having a toolholder socket, a moveable storage rack having a plurality of circumferentially spaced sockets for receiving and storing thereon a plurality of toolholders, means for indexing said storage rack to a position accessible for effecting the removal of a toolholder therefrom; an arm extending radially and substantially horizontal between said storage rack and said spindle, a toolholder carriage reciprocally mounted on said arm, a mechanical hand connected to said carriage, said hand having means for releaseably grasping a toolholder from said storage rack or spindle to remove it therefrom, and a drive means for effecting the drive of said carriage and mechanical hand carried thereby in an involute path toward and away from said spindle; said drive means including a first and second cylinder disposed in tandem, a piston mounted in each of said cylinders for dividing each of said cylinders into a pair of complementary expandable chambers, a common piston rod interconnecting said pistons, means for alternately directing an actuating fluid under pressure into one or the other of said complementary pair of expandable chambers of said first cylinder; means defining a closed hydraulic circuit connected between the expandable chambers of said second cylinder, said closed hydraulic circuit including a valveless vena contracta orifice interposed in said circuit between said other pair of complementary chambers, said vena contracta orifice having its smallest restriction free of any obstruction whereby the velocity of the piston rod responsive to the displacement of the piston due to the pressure of the actuating fluid thereon is determined by the free flow of fluid through said vena contracta orifice in said hydraulic circuit, a reservoir for containing a supply of said hydraulic fluid, and means connecting said reservoir in communication with the smallest restriction of said vena contracta orifice.

2. A machine tool as defined in claim 1 wherein said actuating fluid is compressed air and said drive means includes a valve means for alternately controlling the flow of said compressed air to one or the other of said chambers of said first cylinder to effect the displacement of the piston therein, each of said valves being solenoid actuated, and a transmission means for transmitting the displacement of said piston rod to said carriage and hand whereby said carriage and hand traverses an involute path between said storage rack and said spindle.

3. A machine tool as defined in claim 2 wherein said transmission means includes a gear rack connected to said piston rod, a box cam wheel having an endless cam groove and a connected crank arm, a rack pinion connected to said cam box wheel, said rack pinion being disposed in meshing relationship with said gear rack, said arm being pivotally mounted, a cam follower connected to said arm and disposed in engagement with said cam groove; a chain drive connected to said carriage, said chain drive including a drive sprocket having a drive chain threaded thereon, said carriage being connected to said drive chain and a pinion connected to said drive sprocket, and a rack pivotally connected to said crank arm, said rack being disposed in meshing relationship with said drive sprocket pinion.

4. A machine tool as defined in claim 1 wherein said storage rack includes a turntable having circumferentially spaced slots about the periphery thereof, and said indexing means including a Geneva drive in engagement with said slots to effect a step by step rotation of said turntable, and means for driving said Geneva drive, said latter means including an indexing piston and cylinder assembly, an indexing shaft connected to said Geneva drive, a sprocket journalled to said indexing shaft, a chain drive reversely threaded about said sprocket, one end of said chain being connected to said piston of said assembly and a resilient means connected to the other end of said chain to resiliently anchor said chain and a unidirection drive interconnected between said sprocket and index shaft whereby the actuation of said indexing piston and cylinder assembly effects the actuation of said Geneva drive to incrementally advance said turntable accordingly.

5. A machine tool as defined in claim 4 wherein said unidirectional drive includes a transmission plate keyed to said indexing shaft, a ratchet connected to said sprocket, and a pawl pivotally mounted on said transmission plate and engageable with said ratchet to effect the drive of said indexing shaft as said sprocket and ratchet is actuated by said piston and cylinder assembly.

6. A machine tool according to claim 5 and including switch means operated by said piston for signaling that the tool rack disk is in tool receiving or delivering position.

7. In a machine tool according to claim 5 and including a solenoid valve means for controlling the operation of said indexing piston and cylinder assembly, and switch means operated by said piston at the end of its operating stroke for operating said solenoid valve to render said indexing piston and cylinder assembly inoperative and allow said resilient means to return the piston to starting position.

8. In a tool machine having a drive means for an automatic tool changer comprising a pair of tandem cylinder portions, a piston mounted in each cylinder portion for separating each of said cylinder portions into a pair of complementary expandable chambers, a common piston rod interconnecting said pistons reciprocally disposed in each of said cylinder portions, means for alternately directing an actuating fluid into the respective complementary expandable chambers of one of said cylinder portions to effect the drive of said piston rod alternately between a protracted and retracted position, and means defining a closed hydraulic circuit interconnected between the respective complementary expandable chambers of the other cylinder portion to control the rate of movement of said common piston rod, wherein said closed fluid circuit means comprises a reservoir for containing a supply of hydraulic fluid, a conduit between the expandible chambers of said other cylinder portions, a valveless vena contracta orifice interposed in said conduit between said expandible chambers of said other cylinder portions, and means connecting said reservoir to communicate with the smallest restriction of said vena contracta orifice, said reservoir being vented to atmospheric pressure.

9. A drive means for effecting the drive of a carriage of a tool storing and transferring device for use with a machine tool comprising a drive cylinder, a partition dividing said cylinder into a pair of tandem disposed cylinder portions, a piston reciprocally disposed in each of said cylinder portions defining said respective cylinder portions into a pair of complementary expandible chambers, a piston rod interconnecting the respective pistons for simultaneous movement, said piston rod being moveable between a retracted and a protracted position, means for alternately directing an actuating air pressure to the respective expandible chambers defined in one of said cylinder portions to effect the displacement of said piston therein accordingly; a closed hydraulic circuit interconnected to the expandible chambers of said other cylinder portion whereby the hydraulic fluid in said closed circuit is automatically displaced between the expandible chambers of said other cylinder portion as the actuating air pressure is directed to the alternate expandible chambers of the first mentioned cylinder portion, a gear rack connected to said piston rod, and a means operatively connecting said gear rack in driving relationship to said carriage to effect the drive thereof as said cylinder is actuated; and a valveless vena contracta means disposed in said closed hydraulic fluid circuit for controlling the velocity of said piston rod whereby the influence of air pressure and load in determining the velocity of the piston rod is minimized; a reservoir for containing a supply of said hydraulic fluid and a conduit means connecting said reservoir in communication with the smallest restriction of said vena contracta, and means for venting said reservoir to atmosphere.

* * * * *